(12) United States Patent
Tanaka

(10) Patent No.: US 7,431,119 B2
(45) Date of Patent: Oct. 7, 2008

(54) SEAT BELT RETRACTOR

(75) Inventor: Koji Tanaka, Tokyo (JP)

(73) Assignee: Takata Corporation, Tokyo (JP)

( * ) Notice: Subject to any disclaimer, the term of this patent is extended or adjusted under 35 U.S.C. 154(b) by 321 days.

(21) Appl. No.: 11/415,162

(22) Filed: May 2, 2006

(65) Prior Publication Data

US 2006/0261589 A1 Nov. 23, 2006

(30) Foreign Application Priority Data

May 19, 2005 (JP) ............................. 2005-146334

(51) Int. Cl.
*B60R 21/00* (2006.01)
(52) U.S. Cl. ..................... 180/268; 701/45; 280/807
(58) Field of Classification Search ................. 280/807, 280/801.1; 180/268, 286, 289; 701/45; 307/10.1
See application file for complete search history.

(56) References Cited

U.S. PATENT DOCUMENTS

| | | | |
|---|---|---|---|
| 4,630,841 A | 12/1986 | Nishimura et al. | |
| 6,360,981 B1 | 3/2002 | Specht | |
| 6,374,938 B2 * | 4/2002 | Yano et al. ............... | 180/268 |
| 7,308,348 B2 * | 12/2007 | Tanaka et al. ............ | 701/45 |
| 2006/0175453 A1 * | 8/2006 | Takao et al. ............... | 242/374 |
| 2006/0289219 A1 * | 12/2006 | Tanaka ...................... | 180/268 |
| 2006/0290131 A1 * | 12/2006 | Tanaka ...................... | 280/807 |
| 2007/0084955 A1 * | 4/2007 | Tanaka et al. ............. | 242/374 |
| 2007/0114775 A1 * | 5/2007 | Inuzuka et al. ............ | 280/807 |
| 2007/0144810 A1 * | 6/2007 | Tanaka et al. ............. | 180/268 |
| 2007/0144811 A1 * | 6/2007 | Tanaka et al. ............. | 180/268 |

FOREIGN PATENT DOCUMENTS

| | | |
|---|---|---|
| DE | 30 19 298 A1 | 11/1981 |
| GB | 2 337 127 A | 11/1999 |
| JP | 2000-52926 A | 2/2000 |
| JP | 2001-225720 A | 8/2001 |
| JP | 2004-306768 | 11/2004 |

* cited by examiner

*Primary Examiner*—Ruth Ilan
*Assistant Examiner*—Drew J. Brown
(74) *Attorney, Agent, or Firm*—Foley & Lardner LLP

(57) ABSTRACT

A seat belt retractor of a seat belt apparatus to be installed in a vehicle is structured such that when a vehicle door corresponding to a seat belt moves from the closed state to the open state, the seat belt retractor is configured to be in the power transmission operation mode so as to perform the seat belt winding-up action and, after the seat belt winding-up action, the seat belt retractor is configured to be in the power transmission allowing mode so as to maintain the mechanically connected state between a spool and a power transmission mechanism.

9 Claims, 10 Drawing Sheets

SEAT BELT RETRACTOR

BACKGROUND

The present invention relates to a technology for developing a seat belt retractor to be installed in a vehicle.

Conventionally, a seat belt apparatus is known, which is structured to protect an occupant in a vehicle by a seat belt (webbing) restraining the occupant. For example, PCT international application No. 2003-507252 (which is incorporated by reference herein in its entirety) discloses a structure of a seat belt retractor of a seat belt apparatus, in which a spool (winding shaft) can be rotated for winding and unwinding of a seat belt by an electric motor.

SUMMARY

One embodiment of the invention relates to a seat belt retractor. The retractor comprises: a spool capable of winding and unwinding a seat belt; an electric motor; a power transmission mechanism disposed between the electric motor and the spool to achieve a connected state when the electric motor and the spool are connected and a disconnected state when the connected state is cancelled; and a control mechanism to control the electric motor and the power transmission mechanism to switch between a power transmission operation mode in which the electric motor is driven and the power transmission mechanism is in the connected state, a power transmission allowing mode in which the driving of the electric motor is stopped and the power transmission mechanism is in the connected state, and a power transmission disconnection mode in which the power transmission mechanism is in the disconnected state. When a vehicle door corresponding to the seat belt moves from the closed state to an open state, the control mechanism switches to the power transmission operation mode to conduct the seat belt winding-up action by the spool and, after the seat belt winding-up action, the control mechanism switches to the power transmission allowing mode to maintain the power transmission mechanism in the connected state.

Another embodiment of the invention relates to a seat belt apparatus. The apparatus comprises: a seat belt to be worn by a vehicle occupant; a spool capable of winding and unwinding the seat belt; an electric motor; a power transmission mechanism disposed between the electric motor and the spool to achieve a connected state when the electric motor and the spool are connected and a disconnected state when the connected state is cancelled; and a control mechanism to control the electric motor and the power transmission mechanism to switch between a power transmission operation mode in which the electric motor is driven and the power transmission mechanism is in the connected state, a power transmission allowing mode in which the driving of the electric motor is stopped and the power transmission mechanism is in the connected state, and a power transmission disconnection mode in which the power transmission mechanism is in the disconnected state. When a vehicle door corresponding to the seat belt moves from a closed state to an open state, the control mechanism switches to the power transmission operation mode to conduct the seat belt winding-up action by the spool and, after the seat belt winding-up action, the control mechanism switches to the power transmission allowing mode to maintain the power transmission mechanism in the connected state.

Another embodiment of the invention relates to a vehicle. The vehicle comprises: a vehicle door; a detection sensor to detect information about the opening and closing of the vehicle door; and a seat belt apparatus accommodated in an accommodating space in the vehicle. The seat belt apparatus includes a seat belt to be worn by a vehicle occupant and corresponding to the vehicle door; a spool capable of winding and unwinding the seat belt; an electric motor; a power transmission mechanism disposed between the electric motor and the spool to achieve a connected state when the electric motor and the spool are connected and a disconnected state when the connected state is cancelled; and a control mechanism to control the electric motor and the power transmission mechanism to switch between a power transmission operation mode in which the electric motor is driven and the power transmission mechanism is in the connected state, a power transmission allowing mode in which the driving of the electric motor is stopped and the power transmission mechanism is in the connected state, and a power transmission disconnection mode in which the power transmission mechanism is in the disconnected state. When the vehicle door moves from a closed state to an open state, the control mechanism switches to the power transmission operation mode to conduct the seat belt winding-up action by the spool and, after the seat belt winding-up action, the control mechanism switches to the power transmission allowing mode to maintain the power transmission mechanism in the connected state.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 4(a) and 4(b) show the seat belt retractor of the embodiment shown in FIG. 3 without a retainer cover, wherein FIG. 4(a) is a perspective view thereof and FIG. 4(b) is a left side view thereof.

FIGS. 5(a) and 5(b) show a sun gear member used in the seat belt retractor of the embodiment shown in FIG. 3, wherein FIG. 5(a) is a perspective view thereof and FIG. 5(b) is a perspective view thereof as seen from a direction of IIIB in FIG. 5(a).

DETAILED DESCRIPTION

Figure 1:
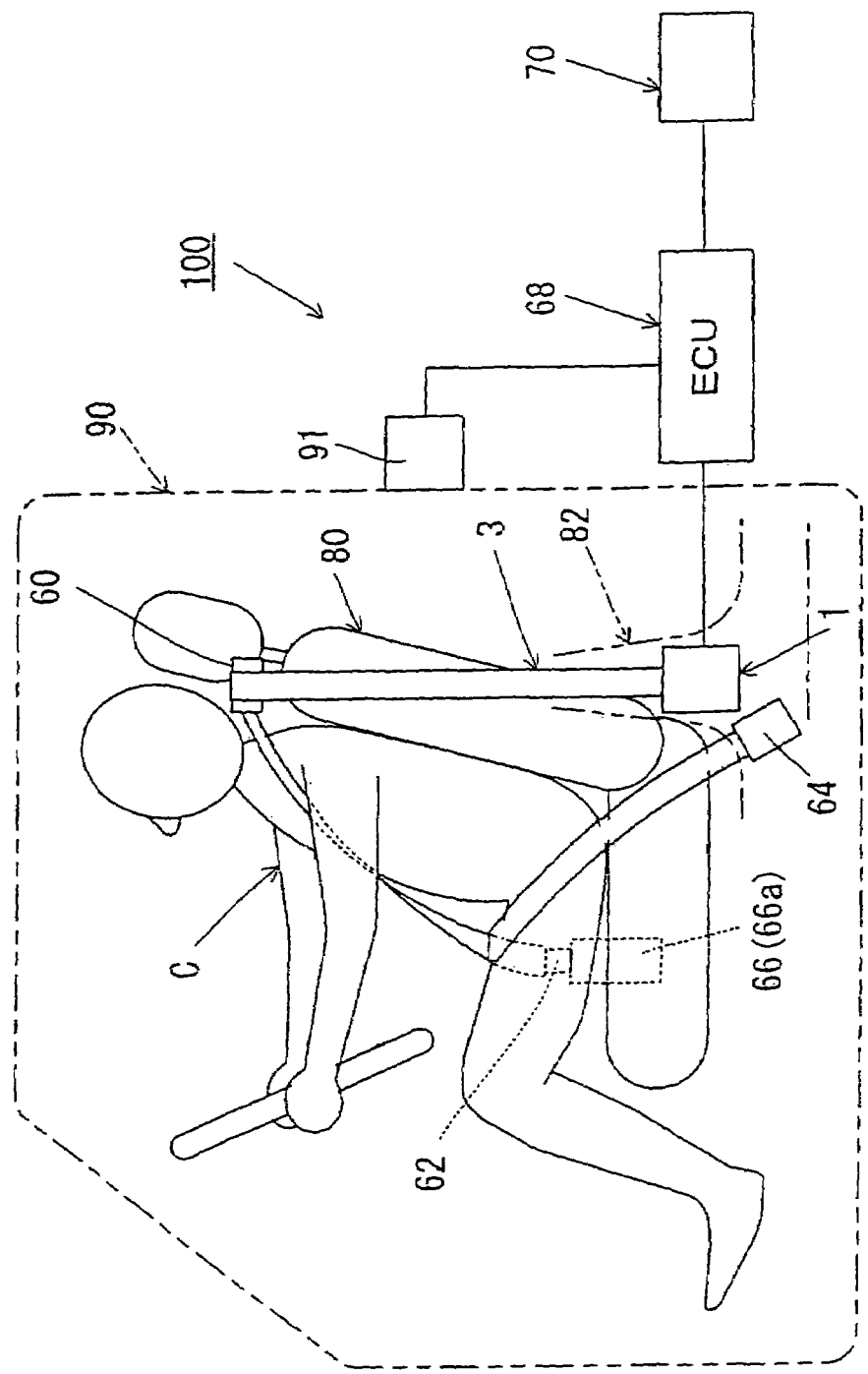
FIG. 1 is an illustration showing the structure of a seat belt apparatus according to an embodiment of the invention.

The technology described in PCT international application No. 2003-507252 proposes a possibility of using an electric motor to conduct the action of the spool for winding or unwinding the seat belt, as a structure of the seat belt retractor. With regard to the design of such seat belt apparatuses, it is required to prevent occurrence of a situation that the seat belt is kept in the unwound state without being stored when the storing operation of the seat belt is needed.

An object of the present invention to provide a technology effective for reliably conducting the storing operation of a seat belt by an electric motor in a seat belt retractor to be installed in a vehicle.

Embodiments of the present invention can be typically adopted to a seat belt retractor to be installed in an automobile. In addition, embodiments of the present invention can be adapted to a technology for developing a seat belt retractor to be installed in a vehicle other than the automobile, such as aircraft, boat, and train.

The seat belt retractor of a first embodiment comprises at least a spool, an electric motor, a power transmission mechanism, and a control mechanism.

The spool is a member which is capable of winding or unwinding the seat belt. The seat belt capable of being wound onto and unwound from the spool is a long belt to be worn by a vehicle occupant seated in a seat and is sometimes called "webbing". Typically, the vehicle occupant seated in the vehicle seat is restrained by the seat belt when restraint is required such as in a vehicle collision, thereby ensuring the protection of the vehicle occupant.

The power transmission mechanism is disposed between the electric motor and the spool to achieve a connected state where the electric motor and the spool are connected and a disconnected state where the connected state is cancelled. The power transmission mechanism may be a "clutch" formed of gear members and the like.

In the connected state of the power transmission mechanism, the spool is mechanically connected to the power transmission mechanism so that the power of the electric motor is allowed to be transmitted to the spool via the power transmission mechanism. Therefore, by driving the electric motor when the power transmission mechanism is in the connected state, the power of the electric motor is transmitted to the spool via the power transmission mechanism. When the driving of the electric motor is stopped when the power transmission mechanism is in the connected state, the power of the electric motor is not transmitted to the spool. However, since high resistance against unwinding is applied to the spool by the power transmission mechanism mechanically connected to the spool, the unwinding (withdrawal) of the seat belt from the spool is restricted. Specifically, the seat belt is hardly unwound (withdrawn) from the spool or the seat belt is not allowed to be unwound (withdrawn) from the spool.

On the other hand, in the disconnected state of the power transmission mechanism, the resistance against unwinding applied to the spool by the power transmission mechanism is reduced, regardless of whether the electric motor is driven or not driven, because the mechanical connection with the spool is cancelled, thereby allowing the easy unwinding (withdrawal) of the seat belt from the spool.

The control mechanism is a mechanism for controlling the electric motor and the power transmission mechanism to switch between a power transmission operation mode, a power transmission allowing mode, and a power transmission disconnection mode.

In the power transmission operation mode, the electric motor is driven and the power transmission mechanism is in the connected state. Accordingly, when the electric motor and the power transmission mechanism are controlled to select the power transmission operation mode, the power of the electric motor is transmitted to the spool via the power transmission mechanism, thereby conducting the winding (storing) action of the seat belt.

In the power transmission allowing mode, the driving of the electric motor is stopped and the power transmission mechanism is in the connected state. When the electric motor and the power transmission mechanism are controlled to the power transmission allowing mode, high resistance against unwinding is applied to the spool by the power transmission mechanism which is mechanically connected to the spool as mentioned above so that the unwinding (withdrawal) of the seat belt from the spool is restricted.

In the power transmission disconnection mode, the power transmission mechanism is in the disconnected state. When the electric motor and the power transmission mode are controlled to the power transmission disconnection mode, the resistance against unwinding applied to the spool by the power transmission mechanism is reduced, regardless of whether the electric motor is driven or not driven, because the mechanical connection with the spool is cancelled, thereby allowing the easy unwinding (withdrawal) of the seat belt from the spool as mentioned above.

The control mechanism is typically composed of a CPU (central processing unit), an input/output unit, a storage unit, a peripheral unit, and the like. The control mechanism may be provided exclusively for the seat belt retractor or used also for other control mechanism for controlling driving circuits and/or electric circuits.

The control mechanism may be adapted to switch to the power transmission operation mode so as to conduct the seat belt winding-up action (seat belt storing action) by the spool when a vehicle door corresponding to the seat belt moves from the closed state to the open state, that is, the vehicle occupant enters or exits the vehicle. Accordingly, the seat belt storing action by the electric motor is conducted. In the seat belt storing action, the seat belt may be in the withdrawn state where the seat belt is withdrawn from the spool or in the storage state where the seat belt is already wound onto the spool.

Further, the control mechanism may be adapted to switch to the power transmission allowing mode to maintain the power transmission mechanism in the connected state after the seat belt winding-up action. Accordingly, the state where high resistance against unwinding is applied to the spool by the power transmission mechanism is maintained so that the unwinding (withdrawal) of the seat belt from the spool is restricted. The detection whether the vehicle door moves from the closed state to the open state can be conducted by using a vehicle door sensor which is arranged corresponding to the vehicle door. The seat belt retractor or the seat belt apparatus of the present invention may include the door sensor.

In the conventional structure where only the opening/closing of the vehicle door and the operation of a seat belt buckle are used as triggers for the seat belt storing operation, for example, when a vehicle occupant starts to withdraw the seat belt for the purpose of wearing the seat belt with the vehicle door being open, but stops the action of withdrawing the seat belt without buckling the seat belt because the occupant remembers that he has an errand to do and is about to exit the vehicle, it is assumed that the withdrawn state of the seat belt is continued and the seat belt is clamped by the vehicle door.

Accordingly in embodiments of the present invention, the seat belt retractor is structured to conduct the action of winding (storing) the seat belt when the vehicle door moves to the open state from the closed state and, after that, restrict the unwinding (withdrawal) of the seat belt from the spool . Specifically, the seat belt is hardly unwound (withdrawn) from the spool or the seat belt is not allowed to be unwound (withdrawn) from the spool. Accordingly, emergence of the aforementioned assumption that the motor is not triggered to operate when the seat belt is in the withdrawn state can be fundamentally prevented, thereby ensuring the operation of storing the seat belt by using the electric motor.

In the seat belt retractor of a second embodiment, when the control mechanism, described above, switches to the power transmission allowing mode after the seat belt winding-up action, the control mechanism controls the switching from the power transmission allowing mode to the power transmission disconnection mode on the condition that the vehicle door moves from the open state to the closed state. That is, when the vehicle door moves to the closed state from the open state after the seat belt winding-up action (seat belt storing action), the control mechanism switches to the power transmission disconnection mode, thereby allowing easy unwinding of the seat belt.

According to such control, the seat belt is restricted from being withdrawn when the vehicle door is in the open state, thereby preventing the seat belt from being kept in the withdrawn state. On the other hand, when, after that, the vehicle door moves to the closed state and the vehicle occupant starts to wear the seat belt, the seat belt is allowed to be withdrawn, thereby allowing smooth wearing of the seat belt by the vehicle occupant. Therefore, this control is especially effective for an assumption, for example, that the vehicle occupant stops the withdrawing action of the seat belt with the vehicle door being open and exits the vehicle and, after that, the vehicle occupant enters the vehicle again, closes the vehicle door, and wears the seat belt. This control must be rational control taking the pattern of vehicle occupant's behavior into consideration.

In the seat belt retractor of a third embodiment, when the control mechanism, described above, switches to the power transmission allowing mode after the seat belt winding-up action, the control mechanism controls the switching from the power transmission allowing mode to the power transmission disconnection mode on the condition that a predetermined reference time is elapsed.

According to such control, the seat belt is restricted from being withdrawn when the vehicle door is in the open state, thereby preventing the seat belt from being kept in the withdrawn state. On the other hand, when the vehicle occupant enters the vehicle and starts to wear the seat belt, the seat belt is allowed to be withdrawn after a lapse of predetermined time regardless of the state of the vehicle door, thereby allowing smooth wearing of the seat belt by the vehicle occupant. Therefore, this control is especially effective for an assumption, for example, that the vehicle occupant stops the withdrawing action of the seat belt with the vehicle door being open and exits the vehicle and, after that without closing the door, the vehicle occupant enters the vehicle a relatively short time later and wears the seat belt. This control must be rational control taking the pattern of vehicle occupant's behavior into consideration.

In various embodiments, the start of the counting of the elapsed time which is used as the base for determining the timing for switching from the power transmission allowing mode to the power transmission disconnection mode may be set to any timing after the vehicle door moves to the open state. Specifically, the start of the counting may be timing when the seat belt winding-up action is started, timing when the seat belt winding-up action is finished, or timing when the vehicle door moves to the open state before the vehicle occupant exits the vehicle. The reference time corresponding to the start of the counting of the elapsed time may be previously estimated and set. For example, when the start of the counting is set to the timing when the seat belt winding-up action is started, time period as a sum of "time period from the start of the seat belt winding-up action to the finish of the seat belt winding-up action" and "time period from alighting of vehicle occupant from the vehicle to boarding of the vehicle occupant on the vehicle" is previously estimated and the reference time is set based on the estimated time period. On the other hand, when the start of the counting is set to the timing when the seat belt winding-up action is finished, "time period from alighting of vehicle occupant from the vehicle to boarding of the vehicle occupant on the vehicle" is previously estimated and the reference time is set based on the estimated time period.

The seat belt apparatus of a fourth embodiment comprises at least a seat belt, a spool, an electric motor, a power transmission mechanism, and a control mechanism. The seat belt is a long belt to be worn by a vehicle occupant seated in a seat and is sometimes called "webbing". Typically, the vehicle occupant seated in the vehicle seat is restrained by the seat belt when restraint is required such as a vehicle collision, thereby ensuring the protection of the vehicle occupant. The spool, the electric motor, the power transmission mechanism, and the control mechanism of this embodiment have substantially the same structures as the spool, the electric motor, the power transmission mechanism, and the control mechanism described above.

Accordingly, embodiments of the present invention provides a seat belt apparatus capable of reliably conducting the seat belt storing operation using the electric motor.

In the seat belt apparatus of a fifth embodiment, when the control mechanism, described above, switches to the power transmission allowing mode after the seat belt winding-up action, the control mechanism controls the switching from the power transmission allowing mode to the power transmission disconnection mode on the condition that the vehicle door moves from the open state to the closed state.

According to such control, the seat belt is restricted from being withdrawn when the vehicle door is in the open state, thereby preventing the seat belt from being kept in the withdrawn state. On the other hand, when, after that, the vehicle door moves to the closed state and the vehicle occupant starts to wear the seat belt, the seat belt is allowed to be withdrawn, thereby allowing smooth wearing of the seat belt by the vehicle occupant. Therefore, this control is especially effective for an assumption, for example, that the vehicle occupant stops the withdrawing action of the seat belt with the vehicle door being in the open state and exits the vehicle and, after that, the vehicle occupant enters the vehicle again, closes the vehicle door, and wears the seat belt. This control must be rational control taking the pattern of vehicle occupant's behavior into consideration.

In the seat belt apparatus of a sixth embodiment, when the control mechanism, described above, switches to the power transmission allowing mode after the seat belt winding-up action, the control mechanism controls the switching from the power transmission allowing mode to the power transmission disconnection mode on the condition that a predetermined reference time is elapsed.

According to such control, the seat belt is restricted from being withdrawn when the vehicle door is in the open state, thereby preventing the seat belt from being kept in the withdrawn state. On the other hand, when the vehicle occupant gets on the vehicle and starts to wear the seat belt, the seat belt is allowed to be withdrawn regardless of the state of the vehicle door after a lapse of predetermined time, thereby allowing smooth wearing of the seat belt by the vehicle occupant. Therefore, this control is especially effective for an assumption, for example, that the vehicle occupant stops the withdrawing action of the seat belt with the vehicle door being open and exits the vehicle and, after that without closing the door, the vehicle occupant enters the vehicle a relatively short time later and wears the seat belt. This control must be rational control taking the pattern of vehicle occupant's behavior into consideration.

The vehicle with a seat belt apparatus of a seventh embodiment comprises at least a seat belt apparatus as claimed in any one of the fourth through sixth embodiments, a vehicle door corresponding to the seat belt, and a detection sensor for detecting information about the opening/closing of the vehicle door. In the vehicle, the seat belt apparatus may be accommodated in an accommodating space in the vehicle such as an accommodating space in a pillar, an accommodating space in a seat, or an accommodating space in another part of the vehicle. The detection sensor may be a contact sensor which can detect the opening/closing state of the vehicle door and comprises a first contact on the vehicle door side and a second contact on a vehicle pillar side and can detect the opening/closing state of the vehicle door according to the contact between the first contact and the second contact.

This structure enables to provide a vehicle in which a seat belt apparatus having increased reliability relating to the seat belt storing operation is accommodated in an accommodating space in the vehicle.

As described in the above, a technology can be provided which is effective in increasing the reliability relating to the seat belt storing operation by employing a structure of a seat belt retractor in which when the vehicle door corresponding to the seat belt moves to the open state from the closed state, the control mechanism switches to the power transmission operation mode to conduct the seat belt winding-up action by the spool, and after the seat belt winding-up action, the control mechanism switches to the power transmission allowing mode to maintain the mechanical connection between the spool and the power transmission mechanism.

Hereinafter, various embodiments will be described in detail with reference to drawings. First, description will be made as regard to an embodiment with reference to FIG. 1 through FIG. 4.

Figure 2:
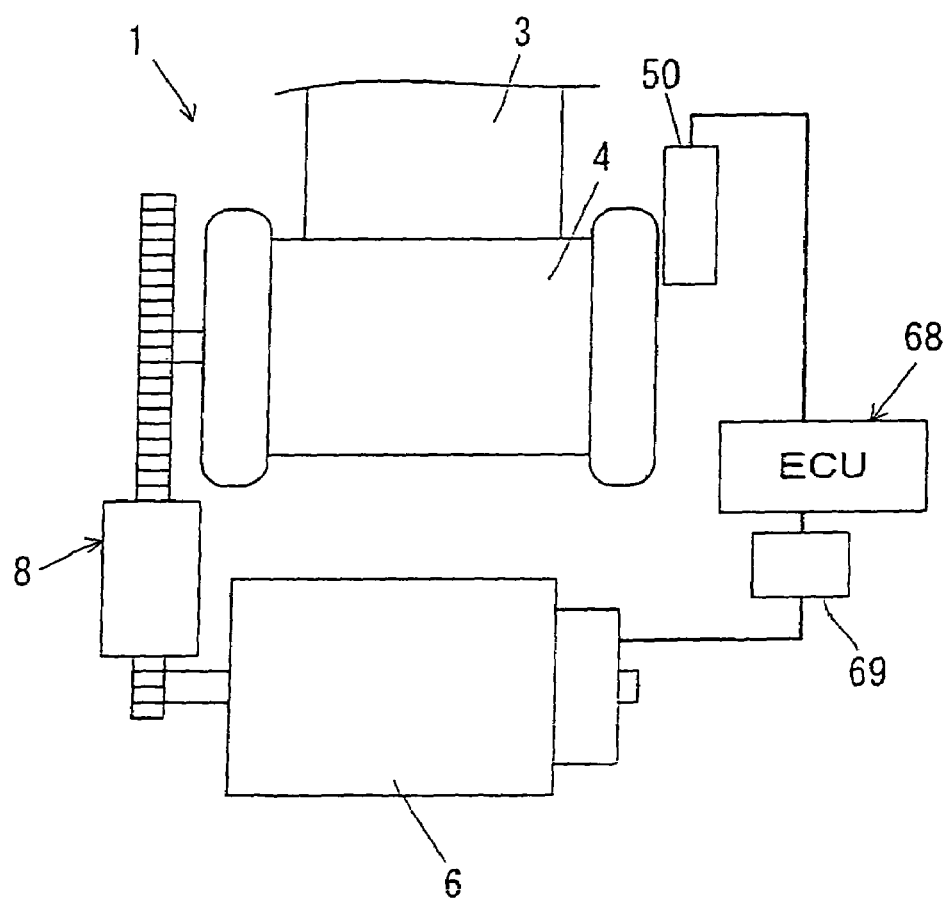
FIG. 2 is an illustration showing the schematic structure of a seat belt retractor shown in FIG. 1.
Figure 3:
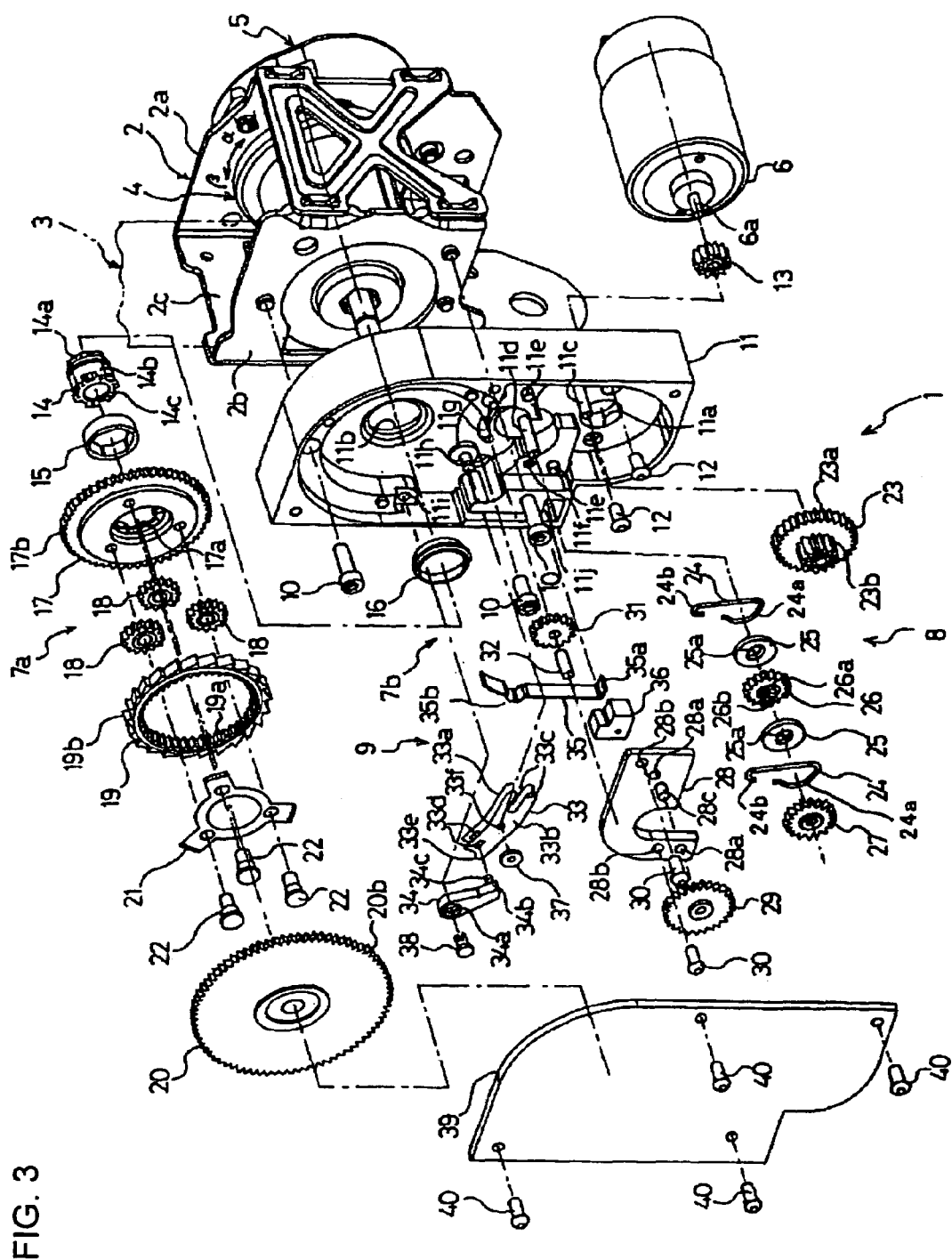
FIG. 3 is an exploded perspective view of a seat belt retractor as an embodiment of the present invention.
Figure 4A:
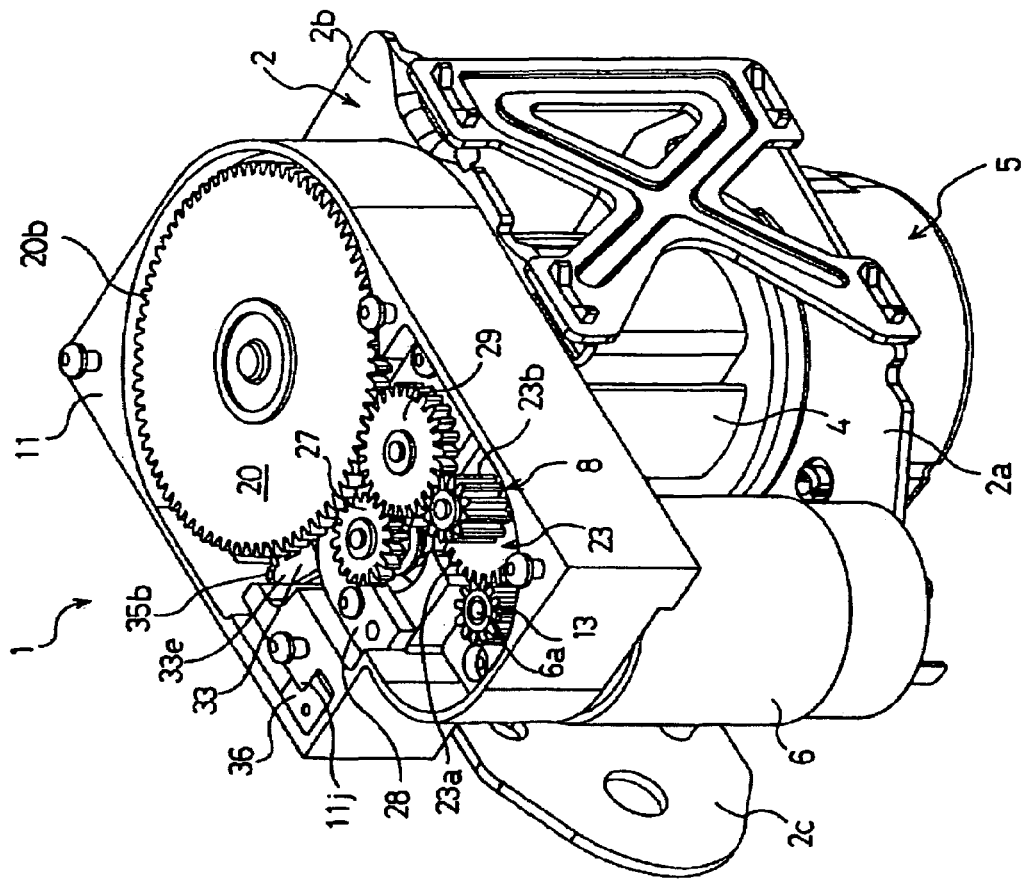
Figure 4B:
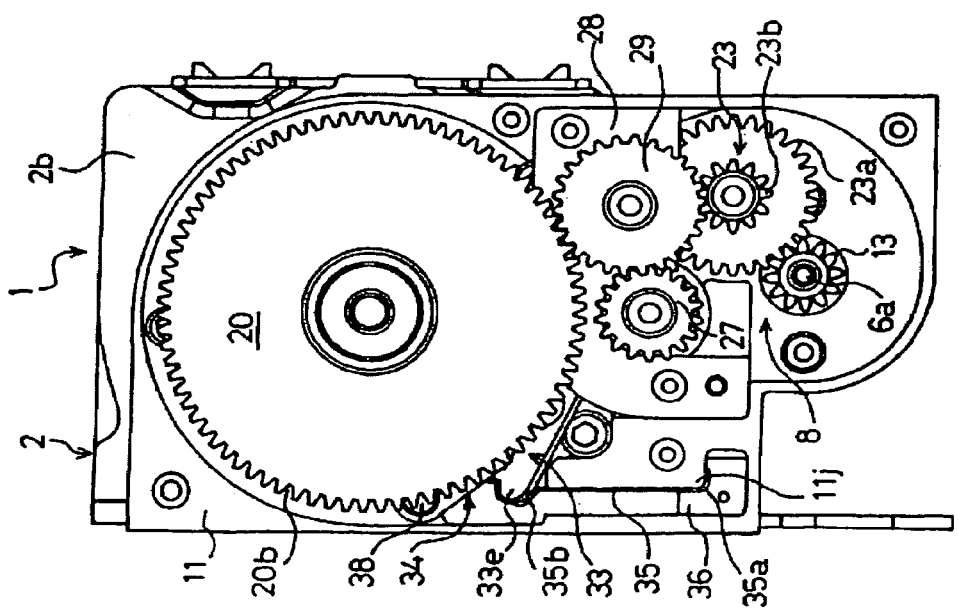

FIG. 1 is an illustration showing the structure of a seat belt apparatus 100. FIG. 2 is an illustration showing the schematic structure of a seat belt retractor 1 shown in FIG. 1. FIG. 3 is an exploded perspective view of a seat belt retractor 1. FIGS. 4(a) and 4(b) show the seat belt retractor 1 of the embodiment shown in FIG. 3 without a retainer cover, wherein FIG. 4(a) is a perspective view thereof and FIG. 4(b) is a left side view thereof. In the following description, unless stated, "left" and "right" are "left" and "right" in the drawing used for the explanation and "clockwise" and "counterclockwise" are "clockwise" and "counterclockwise" in the drawing used for the explanation.

As shown in FIG. 1, the seat belt apparatus 100 of this embodiment is a seat belt apparatus for a vehicle to be installed in an automotive vehicle and mainly consists of a seat belt retractor 1, a seat belt 3, and an ECU 68. In addition, an input element 70 is installed in the vehicle to detect information about collision prediction or collision occurrence of the vehicle, information about the driving state of the vehicle, information about the sitting position and the body size of a vehicle occupant seated in a vehicle seat, information about traffic conditions around the vehicle, information about weather condition and about time zone, and the like and to input such detected information to the ECU 68. The detected information of the input element 70 is transmitted to the ECU 68 anytime or at predetermined intervals and is used for the operation control of the seat belt apparatus 100 and the like. A vehicle door sensor 91 is mounted on the vehicle so as to detect the open-close state of a vehicle door 90. The vehicle door sensor 91 corresponds to a detection sensor for detecting information about the opening and closing of the vehicle door. As the vehicle door sensor 91, for example, a contact sensor which comprises a first contact on the vehicle door side and a second contact on a vehicle pillar side and can detect the open-close state of the vehicle door according to the contact between the first contact and the second contact. The information detected by the vehicle door sensor 91 is transmitted to the ECU 68 and is used for "retractor control process" as will be described later with regard to FIG. 9.

The seat belt 3 is a long belt (webbing) to be used for restraining a vehicle occupant C seated in a vehicle seat 80 as a driver's seat. The seat belt 3 is withdrawn from the seat belt retractor 1 fixed relative to the vehicle and extends through a deflection fitting 60 provided around an area about the shoulder of the vehicle occupant C and is connected to an outer anchor 64 through a tongue 62. The deflection fitting 60 has a function of holding the seat belt 3 to the area about the shoulder of the occupant C and guiding the seat belt 3. By inserting the tongue 62 to a buckle 66 fixed to the vehicle body, the seat belt 3 moves into the state worn by the vehicle occupant C. The buckle 66 has a built-in buckle switch 66a. The buckle switch 66a detects that the tongue 62 is inserted into the buckle 66 (actually, detects that the seat belt moves into the worn state).

The seat belt retractor 1 is a device capable of performing the action of winding or unwinding the seat belt 3 by a spool 4 as will be described. The retractor 1 is installed in an accommodating space in a B-pillar 82 of the vehicle in the embodiment shown in FIG. 1.

The ECU 68 has a function of conducting the control of the seat belt retractor 1 and other operational mechanisms based on the input signals from the input element 70 and comprises a CPU (Central processing unit), an input/output unit, a storage unit, a peripheral unit, and the like. Particularly in this embodiment, the ECU 68 controls a motor 6, as will be described later, of the seat belt retractor 1. Specifically, the ECU 68 controls the amount of current supplied to an electromagnetic coil of the motor 6 and the direction of the current supply so as to vary the rotational speed or the rotational direction of a shaft of the motor 6. The ECU 68 is structured as a mechanism for controlling the drive of the motor 6 and controlling a power transmission mechanism 8 and a power transmission mode switching mechanism 9, as will be described later, to switch between the state where the power of the motor 6 is transmitted to the spool 4 and the state where the power is not transmitted to the spool 4. The details will be described later. The mode of the seat belt retractor is switched by the ECU or control mechanism 68 among a power transmission disconnection mode, a low reduction ratio power transmission mode, and a high reduction ratio power transmission mode. The ECU 68 may be exclusive to the seat belt retractor 1 or used also for other mechanisms for controlling driving circuits and/or electric circuits.

As shown in FIG. 2, the seat belt retractor 1 has a detection sensor 50 for directly detecting information about the rotation of the spool 4. The detection sensor 50 is a sensor for detecting the rotation information about the rotation of the spool 4. In this embodiment, based on the information detected by the detection sensor 50, the ECU 68 controls the motor 6. As the information detected by the detection sensor 50, condition of the spool 4 whether it is rotated or not, rotational angle, rotational direction, rotational speed, rotational amount or the like may be suitably used. As the detection sensor 50, a Hall sensor, a volume sensor, a photointerrupter, or the like may be suitably used.

Hereinafter, detailed structure of the seat belt retractor 1 of this embodiment will be described.

As shown in FIG. 3, the seat belt retractor 1 of this embodiment generally comprises a frame 2, a seat belt 3 restraining the occupant when required, a spool 4 for winding up the seat belt 3, a locking mechanism 5 which is attached to one side of the frame 2 for preventing the spool 4 from rotating in the belt withdrawing direction a when large deceleration exceeding a predetermined deceleration value is generated such as in the event of vehicle collision, a motor 6 for generating rotational torque to be applied to the spool 4, the power transmission mechanism 8, and the power transmission mode switching mechanism 9. The power transmission mechanism 8 has a high-ratio speed reduction mechanism 7a for transmitting the rotation of the motor 6 to the spool 4 after reducing the speed of the rotation at a relatively high reduction ratio and a low-ratio speed reduction mechanism 7b for transmitting the rotation of the motor 6 to the spool 4 after reducing the speed of the rotation at a relatively low reduction ratio. In the power transmission mechanism 8, a first power transmission path and a second power transmission path are set so that the power transmission mechanism 8 transmits the rotational torque of the motor 6 to the spool 4 selectively through either the first power transmission path or the second power transmission path. The power transmission mode switching mechanism 9 sets the power transmission mechanism 8 selectively into either the first power transmission path or the second power transmission path.

The power transmission mechanism 8 and the power transmission mode switching mechanism 9 are disposed between the motor 6 and the spool 4 and compose together a mechanism (so-called "clutch") for connecting and disconnecting the motor 6 and the spool 4. The state where the motor 6 and the spool 4 are connected is a state where the power of the motor 6 is allowed to be transmitted to the spool 4. As the motor 6 is driven in this state, the power of the motor 6 is transmitted to the spool 4. When the motor 6 is stopped in this state, high resistance in the unwinding direction is applied to the spool 4 so that the unwinding (withdrawing) of the seat belt from the spool is restricted. On the other hand, in the state where the motor 6 is disconnected from the spool 4, the resistance in the unwinding direction applied to the spool 4 is reduced so as to allow easy unwinding (withdrawing) of the seat belt 3 from the spool 4.

The frame 2 comprises a pair of parallel side walls 2a, 2b and a back plate 2c connecting the side walls 2a and 2b. Between the side walls 2a and 2b of the frame 2, the spool 4 for winding up the seat belt 3 is rotatably arranged. The spool 4 may be a conventionally well known spool for seat belt retractors. The spool 4 is adapted as a member for operating the winding and the unwinding of the seat belt.

The locking mechanism 5 is attached to the side walls 2a. The locking mechanism 5 may be a conventionally well known locking mechanism for seat belt retractors. That is, the locking mechanism 5 is activated to prevent the spool 4 from rotating in the withdrawing direction a when a vehicle sensor (a deceleration sensor) detects a large deceleration exceeding a predetermined deceleration value applied to the vehicle or when a webbing sensor (belt withdrawing speed sensor) detects a withdrawing speed exceeding a predetermined speed.

Between the spool 4 and the locking mechanism 5, a force limiter mechanism (an energy absorbing mechanism: hereinafter, referred to as "EA mechanism") (not shown), which is conventionally well known in the art, for limiting the load on the seat belt 3 when the withdrawal of the seat belt 3 is prevented by the actuation of the locking mechanism 5 is arranged. The EA mechanism may be composed, for example, of a conventionally well known torsion bar. In this case, when the withdrawal of the seat belt 3 is prevented by the actuation of the locking mechanism 5, the torsion bar is twisted and deformed so as to limit the load on the seat belt 3, thereby absorbing impact energy.

As shown in FIG. 3 and FIG. 4(a), a retainer 11 is mounted to the side wall 2b of the frame 2 by three screws 10 and the motor 6 is attached to the retainer 11 by a pair of screws 12 at a side which is fixed to the frame 2. A motor rotary shaft 6a of the motor 6 extends through a through hole 11a of the retainer 11. A motor gear 13 having external teeth is attached to the motor rotary shaft 6a projecting on the side opposite to the frame 2 side of the retainer 11 such that the motor gear 13 can rotate together with the motor rotary shaft 6a. The motor 6 is adapted as an electrically-operated motor.

As shown in FIG. 3, between both the spool 4 and the aforementioned EA mechanism (for example, the torsion bar) and the speed reduction mechanisms 7a, 7b, a connector 14 for connecting these in the rotational direction is disposed. The connector 14 comprises a first rotational connecting portion 14a for connecting both the spool 4 and the EA mechanism in the rotational direction, a second rotational connecting portion 14b for connecting a connector-side bearing 15 in the rotational direction, and a third rotational connecting portion 14c which is formed with splines for connecting the speed reduction mechanisms 7a, 7b in the rotational direction.

The first rotational connecting portion 14a is formed into a polygonal cylindrical shape, but not clearly shown in FIG. 3. The outer periphery of the first rotational connecting portion 14a is connected to the spool 4 such that the first rotational connecting portion 14a can rotate together with the spool 4, while the inner periphery of the first rotational connecting portion 14a is connected to the EA mechanism (for example, the torsion bar) such that the first rotational connecting portion 14a can rotate together with the EA mechanism (since the structure connecting the connector 14 with the spool 4 and the EA mechanism to rotate together is conventionally well known, the detailed description will be omitted.).

The outer periphery of the second rotational connecting portion 14b is formed to have a polygonal section, while the inner periphery of the connector-side bearing 15 is formed to have a same polygonal section. The connector-side bearing 15 is fitted onto the second rotational connecting portion 14b, whereby the connector-side bearing 15 is attached to the connector 14 not to allow the relative rotation therebetween. A retainer-side bearing 16 is attached to an aperture 11b of the retainer 11 not to allow the relative rotation therebetween. The connector-side bearing 15 is supported by the retainer-side bearing 16 to allow the relative rotation, whereby the connector 14 is rotatably supported by the retainer 11.

The third rotational connecting portion 14c has a predetermined number of engaging grooves, such as splines, which extend in the axial direction and which are formed at equal intervals in the circumferential direction.

The high-ratio speed reduction mechanism 7a comprises an annular carrier gear 17, a predetermined number (three in the illustrative embodiment) of planet gears 18 which are rotatably attached to the carrier gear 17, a circular ring member 19, and a sun gear member 20.

The inner periphery 17a of the carrier gear 17 is provided, at its connector 14 side, with a predetermined number of engaging grooves, such as splines, which are formed at equal interval in the circumferential direction to extend in the axial direction. The engaging grooves of the inner periphery 17a are fitted to convexes between the engaging grooves of the third rotational connecting portion 14c of the connector 14 and convexes between the engaging grooves of the inner periphery 17a are fitted to the engaging grooves of the third rotational connecting portion 14c of the connector 14 (just like spline engagement), whereby the carrier gear 17 is connected to the connector 14 not to allow the relative rotation therebetween, i.e., to rotate together with the connector 14. The carrier gear 17 has external teeth 17b in the outer periphery thereof.

The planet gears 18 are rotatably attached to the carrier gear 17 via a speed reduction plate 21 by speed reduction pins 22.

The ring member 19 comprises an internal gear 19a formed in the inner periphery thereof and ratchet teeth 19b formed in the outer periphery thereof so that the internal gear 19a and the ratchet teeth 19b rotate together with each other.

Figure 5B:
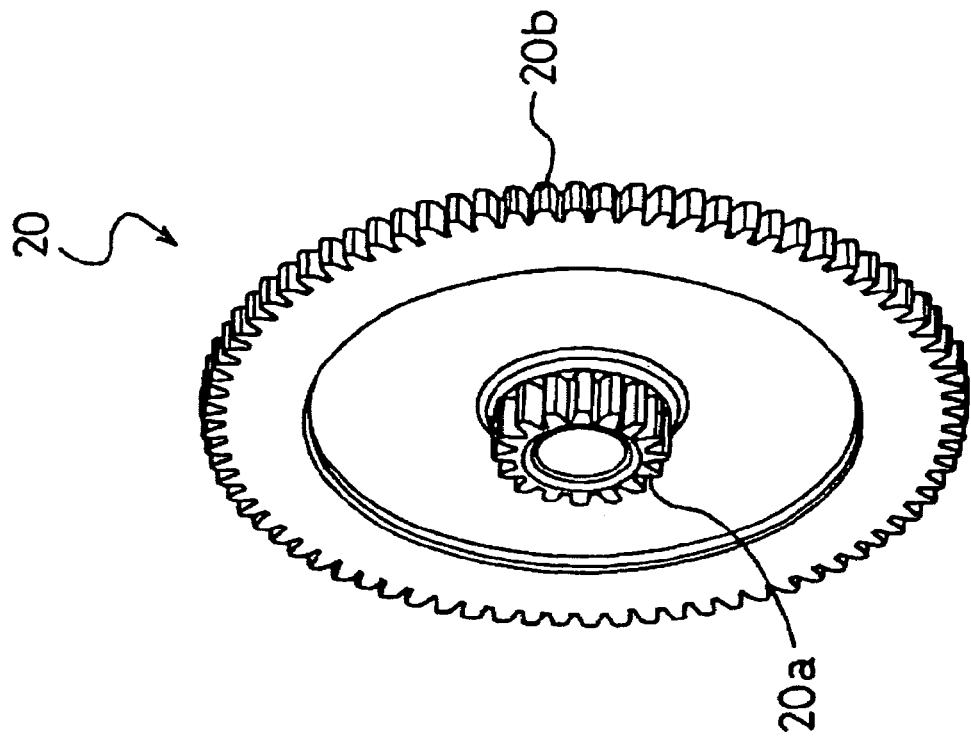
Figure 5A:
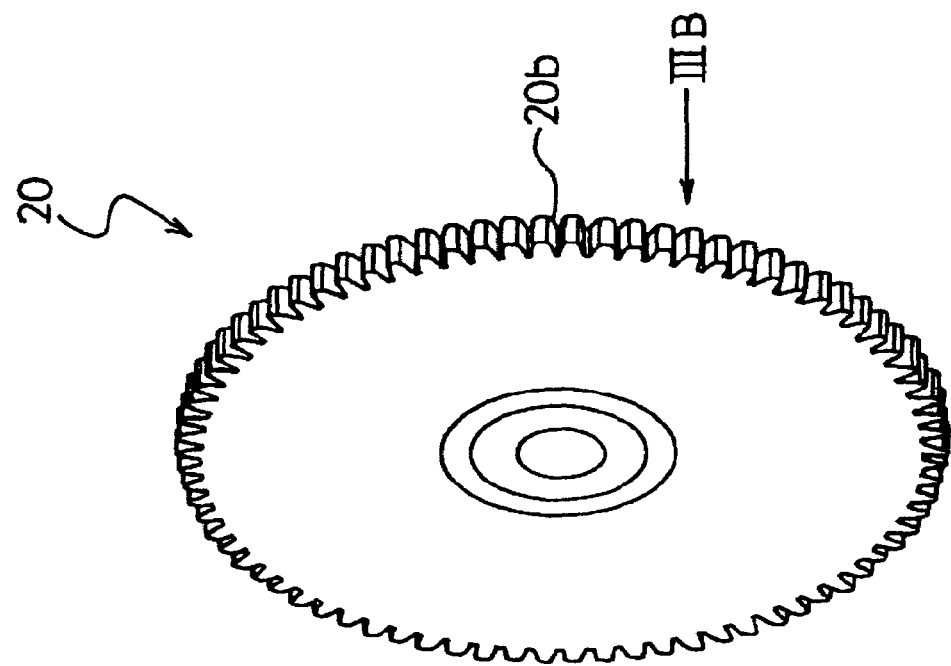

As shown in FIGS. 5(a) and 5(b), the sun gear member 20 comprises a sun gear 20a, composed of small-diameter external teeth, and large-diameter external teeth 20b so that the sun gear 20a and the external teeth 20b rotate together with each other.

The planet gears 18 supported by the carrier gear 17 always mesh with both the sun gear 20a and the internal gear 19a, thereby composing a planetary gear mechanism. Therefore, the speed reduction mechanism 7 is adapted as a planetary gear mechanism of which the input is defined by the sun gear 20a and the output is defined by the carrier gear 17.

As shown in FIG. 3, the power transmission mechanism 8 further comprises a connecting gear 23, a pair of clutch springs 24, a pair of pulleys 25, a lower-side connecting gear 26 having external teeth, an upper-side connecting gear 27 having external teeth, a guide plate 28, and an idle gear 29 having external teeth.

The connecting gear 23 is rotatably supported by a rotary shaft 11c projecting from the retainer 11 and comprises a first connecting gear 23a, composed of large-diameter external teeth, and a second connecting gear 23b, composed of small-diameter external teeth so that the first and second connecting gears 23a, 23b rotate together with each other. In this regard, as shown in FIGS. 4(a) and 4(b), the large-diameter first connecting gear 23a always meshes with the motor gear 13.

As shown in FIG. 3, the lower-side connecting gear 26 has rotary shafts 26a which are formed to project from the both side surfaces thereof (only one of the rotary shafts 26a is shown in FIG. 3) and a through hole 26b which is formed to axially extend through the rotary shafts 26a. Each rotary shaft 26a has flat portions so that an elongate hole 25a of each pulley 25 is fitted to the rotary shaft, whereby the elongate hole 25a partially extends along the faces of the flat portions. Therefore, the pulleys 25 are supported on the both side surfaces of the lower-side connecting gear 26, respectively, so that the pulleys 25 rotate together with the lower-side connecting gear 26. The clutch springs 24 each have a first curved engaging portion 24a which is engaged with each pulley 25. Further, the upper-side connecting gear 27 is supported on one rotary shaft 26a of the lower-side connecting gear 26 such that the upper-side connecting gear 27 rotates together with the lower-side connecting gear 26. The respective pulleys 25, the lower-side connecting gear 26, and the upper-side connecting gear 27 are rotatably supported by the rotary shaft 11d projecting from the retainer 11.

A pair of screws 30 are inserted into corresponding holes 28b of a guide plate 28 and are screwed into a pair of threaded holes 11f formed in the retainer 11 in a state that holes 28a of the guide plate 28 are fitted to and held by a pair of supporting shafts 11e projecting from the retainer 11, whereby the guide plate 28 is attached to the retainer 11. The idle gear 29 is rotatably supported on a rotary shaft 28c projecting from the guide plate 28.

As shown in FIGS. 4(a) and 4(b), the idle gear 29 always mesh with the external teeth 20b of the sun gear member 20, the small-diameter second connecting gear 23b of the connecting gear 23, and the upper-side connecting gear 27.

The low-ratio speed reduction mechanism 7b comprises the upper-side connecting gear 27, the lower-side connecting gear 26, a clutch gear 31, and the carrier gear 17.

Therefore, the rotational torque of the motor 6 transmitted to the idle gear 29 is transmitted from the idle gear 29 to the spool 4 via the low-ratio speed reduction mechanism 7b or via the high-ratio speed reduction mechanism 7a.

As shown in FIG. 3, the power transmission mode switching mechanism 9 comprises the clutch gear 31 having external teeth, a rotary shaft 32, a clutch arm 33, a clutch pawl 34, a resistance spring 35, and a spring stopper 36.

Figure 7:
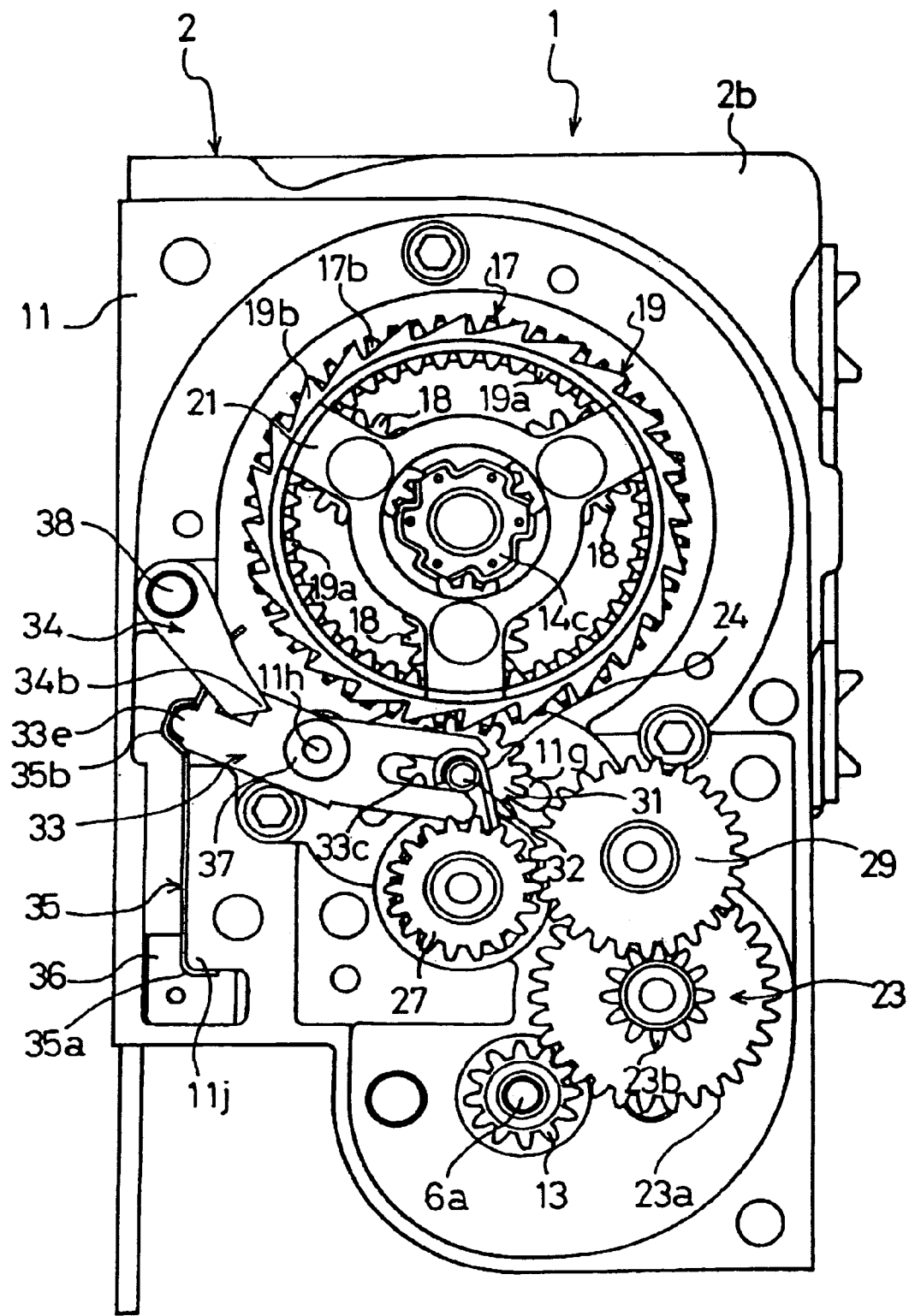
FIG. 7 is a left side view showing a state of the low reduction ratio power transmission mode of the seat belt retractor of the embodiment shown in FIG. 3 without showing some components.

As shown in FIG. 7, the clutch gear 31 can mesh with the external teeth 17b of the carrier gear 17 of which diameter is larger than that of the clutch gear 31 and always meshes with the lower-side connecting gear 26 (not shown). The rotary shaft 32 extends through a central hole 31a of the clutch gear 31 to rotatably support the clutch gear 31.

The clutch arm 33 is formed into a U shape in section, composed of side walls 33a, 33b and a bottom (not shown). At one end side, the both side walls 33a, 33b have projecting portions which projects from the bottom and linear supporting grooves 33c which are formed in the projecting portions, respectively. The clutch gear 31 is disposed between the projecting portions of the side walls 33a and 33b so that the rotary shaft 32 projecting from the both sides of the clutch gear 31 is supported by the corresponding supporting grooves 33c in such a manner as to allow movement of the rotary shaft 32 along the supporting grooves 33c. Further, second curved engaging portions 24b of the clutch springs 24 are hooked onto the portions of the rotary shaft 32 projecting from the side walls 33a, 33b, respectively. One end of the rotary shaft 32 is fitted to and supported by a guide slot 11g formed in the retainer 11. The guide slot 11g is formed into a circular arc about the rotary shaft 11d. Therefore, the rotary shaft 32 is movable along a circumference of a circle about the rotary shaft 11d because the rotary shaft 32 is guided by the guide slot 11g.

At the other end side, the side walls 33a and 33b are provided with slots 33d and substantially circular engaging portions 33e, respectively. At the middle in the longitudinal direction, the side walls 33a, 33b are further provided with supporting holes 33f, respectively. The supporting holes 33f are fitted with a supporting shaft 11h projecting from the retainer 11, whereby the clutch arm 33 is pivotably supported. An E-ring 37 is attached to the supporting shaft 11h, thereby preventing the clutch arm 33 from coming off.

Figure 6:
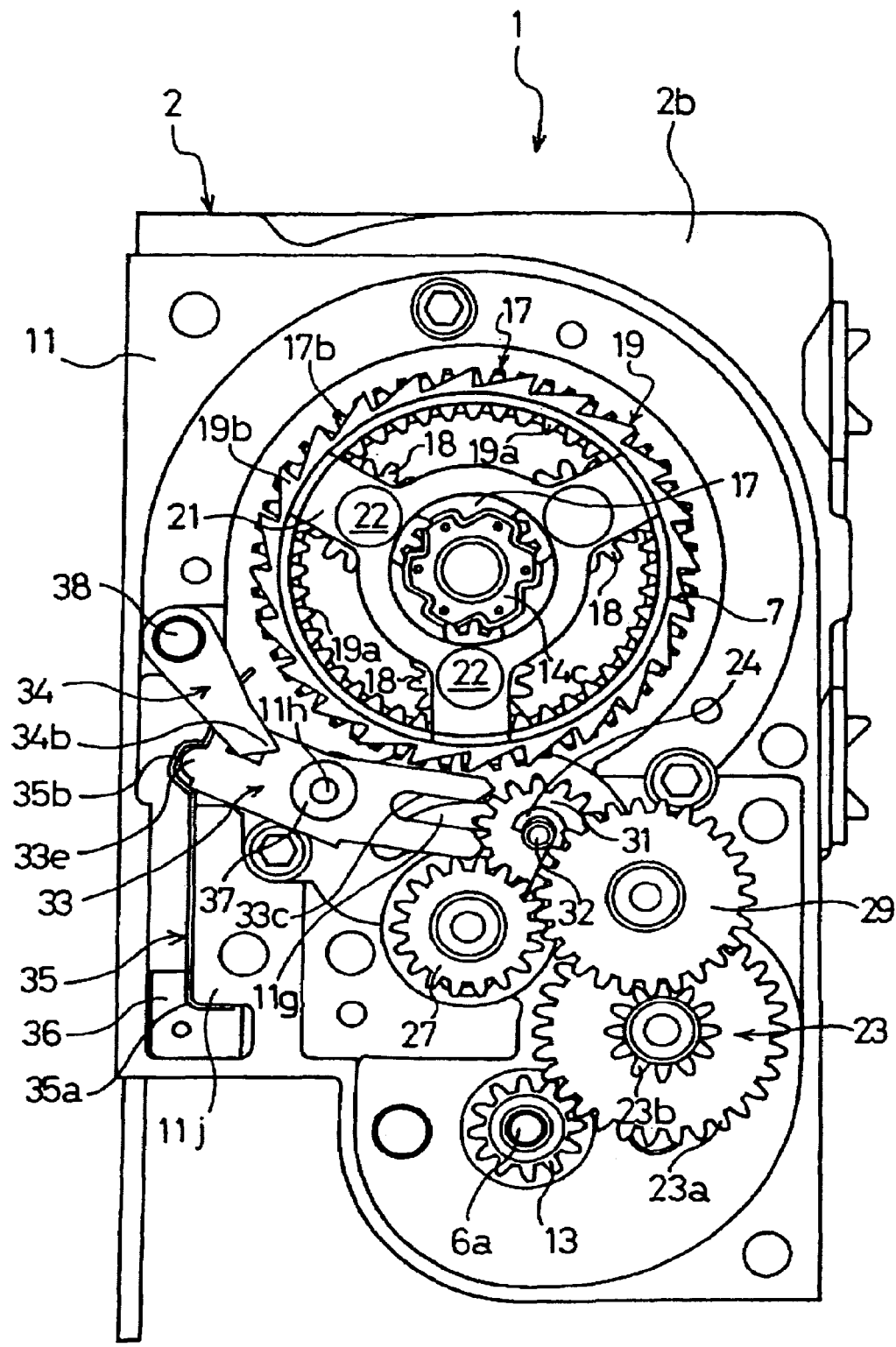
FIG. 6 is a left side view showing a state of the power transmission disconnection mode of the seat belt retractor of the embodiment shown in FIG. 3 without showing some components.
Figure 8:
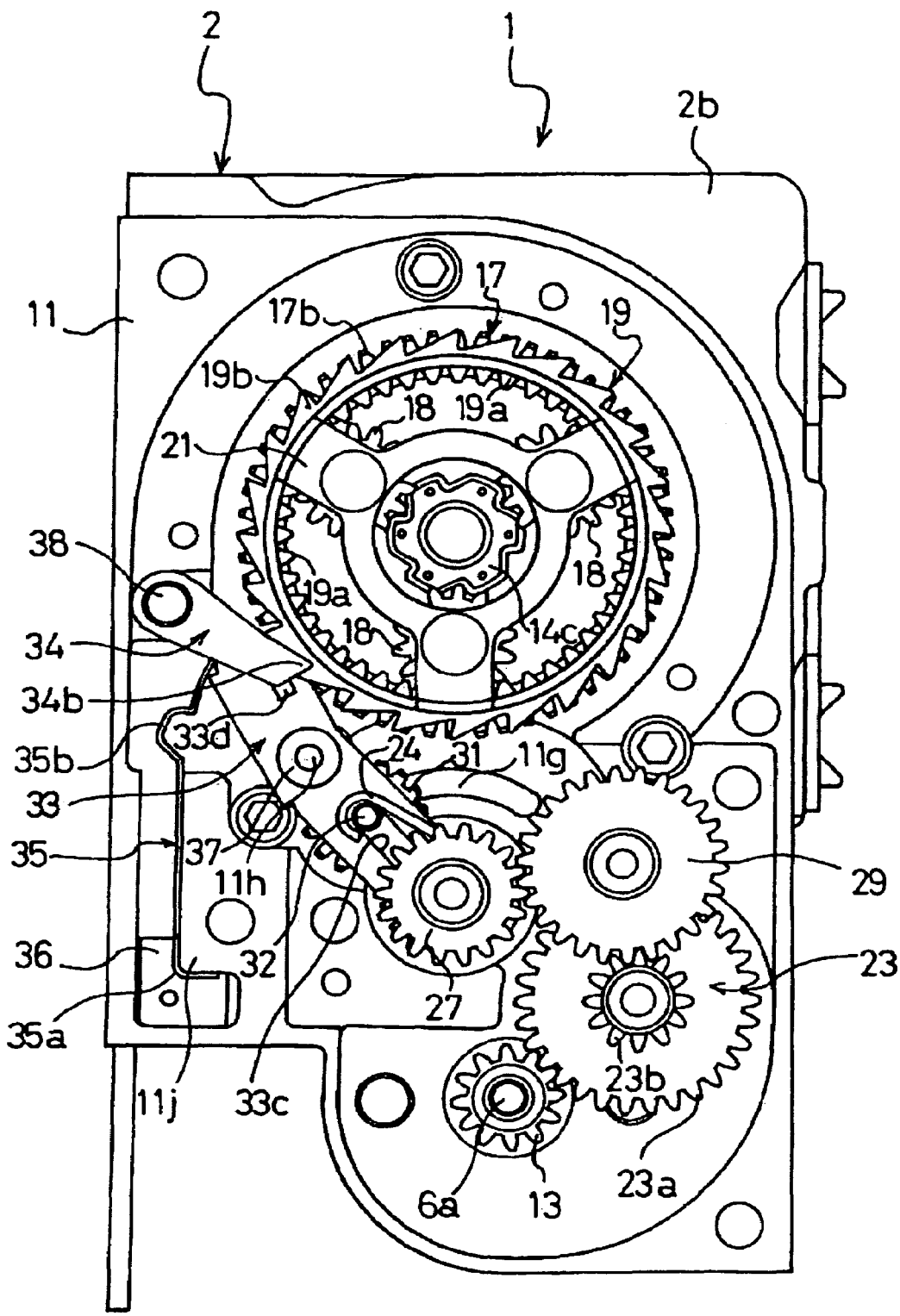
FIG. 8 is a left side view showing a state of the high reduction ratio power transmission mode of the seat belt retractor of the embodiment shown in FIG. 3 without showing some components.

The clutch pawl 34 is provided with a supporting hole 34a at its one end and with an engaging pawl 34b at its other end. Furthermore, the other end of the clutch pawl 34, i.e., the engaging pawl 34b side, includes a connecting pin 34c projecting therefrom. The connecting pin 34c is fitted in the slots 33d of the clutch arm 33 to allow the rotation of the connecting pin 34c relative to the clutch arm 33 and allow the movement of the connecting pin 34c relative to the clutch arm 33 along the slots 33d. As shown in FIG. 6, a pawl pin 38 extends through the supporting hole 34a and is inserted into and connected with a pin hole 11i formed in the retainer 11, whereby the clutch pawl 34 is pivotally mounted to the retainer 11. As shown in FIG. 8, the engaging pawl 34b can engage ratchet teeth 19b when the ring member 19 rotates in the clockwise direction (corresponding to the belt-withdrawing direction α of the spool 4). When the engaging pawl 34b engages one of the ratchet teeth 19b, the rotation of the ring member 19 in the clockwise direction is stopped.

The resistance spring 35 is composed of a band-like plate spring, and has a lower end formed in an L-like shape as a supporting portion 35a and a recess 35b formed in a U-like shape at a middle-upper portion in the longitudinal direction. A portion between the recess 35b and the supporting portion 35a is flat and a portion between the recess 35b and the upper end is curved.

The recess 35b can receive the engaging portion 33e of the clutch arm 33. As shown in FIG. 6, in a state that the engaging portion 33e is received by the recess 35b, the supporting grooves 33c extend in a tangential direction relative to the arc of the guide slot 11g so that the rotary shaft 32 can move from the guide slot 11g to the supporting grooves 33c or from the supporting grooves 33c to the guide slot 11g.

The spring stopper 36 is formed in an L-like shape and the supporting portion 35a is held between the spring stopper 36 and a spring mounting portion 11j formed on the retainer 11, whereby the resistance spring 35 is mounted to the retainer 11 in a cantilever-like manner with the upper end as a free end.

The respective components of the speed reducing mechanism 7, the power transmission mechanism 8 and the power transmission mode switching mechanism 9 are mounted within recesses formed in the face of the retainer 11 opposite to the face fixed to the frame 2, and a retainer cover 39 is attached to the retainer 11 on this face side with a predetermined number (four in the drawings) of screws 40 to cover the components.

The power transmission mechanism 8 and the power transmission mode switching mechanism 9 having the aforementioned structures are controlled by the ECU 68 to switch between the following three power transmission modes. The three power transmission modes will now be described with reference to FIG. 6 through FIG. 8. FIG. 6 is a left side view showing a state of power transmission disconnection mode of the seat belt retractor of the embodiment shown in FIG. 3 without showing some components. FIG. 7 is a left side view showing a state of low reduction ratio power transmission mode of the seat belt retractor of the embodiment shown in FIG. 3 without showing some components. FIG. 8 is a left side view showing a state of high reduction ratio power transmission mode of the seat belt retractor of the embodiment shown in FIG. 3 without showing some components.

(1) Power Transmission Disconnection Mode (Free Mode)

As shown in FIG. 6, in the power transmission disconnection mode, the engaging portion 33e of the clutch arm 33 for the power transmission mode switching mechanism 9 is received by the recess 35b of the resistance spring 35. In the state that the engaging portion 33e is received by the recess 35b, the engaging pawl 34b of the clutch pawl 34 does not engage the ratchet teeth 19b of the ring member 19 so as to allow free rotation of the ring member 19. Accordingly, the torque transmission path (low speed and high torque transmission path as will be described later) between the sun gear member 20 and the carrier gear 17 is disconnected.

On the other hand, the rotary shaft 32 is in contact with the right end of the guide slot 11g so as to set the clutch gear 31 to the rightmost position. At the rightmost position, the clutch gear 31 is spaced away from the external teeth 17b of the carrier gear 17. Accordingly, the torque transmission path (high-speed and low-torque transmission path as will be described later) between the clutch gear 31 and the carrier gear 17 is disconnected.

As a result, in the power transmission disconnection mode, the spool 4 and the motor 6 are not connected so that the rotational torque of the motor 6 is not transmitted to the spool 4 and the rotational torque of the spool 4 is also not transmitted to the motor 6. That is, the power transmission disconnection mode (or disconnected state) is defined as a state that the mechanical connection between the spool 4 and the power transmission mechanism 8 is canceled. On the other hand, the state that the spool 4 and the power transmission mechanism 8 are connected corresponds to the connected state of the power transmission mechanism. In the disconnected state, the spool 4 is completely disconnected from the power transmission mechanism 8 side (the motor 6 side) so that the resistance in the unwinding direction applied to the spool 4 by the power transmission mechanism 8 is reduced, thereby allowing easy rotation of the spool 4. Regardless of the driving of the motor 6, the seat belt 3 can be easily withdrawn (unwound) from the spool 4.

(2) Low Reduction Ratio Power Transmission Mode

As shown in FIG. 7, in the low reduction ratio power transmission mode, the engaging portion 33e of the clutch arm 33 is received by the recess 35b of the resistance spring 35 similarly to the power transmission disconnection mode. In the state that the engaging portion 33e is received by the recess 35b, the engaging pawl 34b of the clutch pawl 34 does not engages the ratchet teeth 19b of the ring member 19 so as to allow free rotation of the ring member 19. Accordingly, the low speed and high torque transmission path between the sun gear member 20 and the carrier gear 17 is disconnected.

On the other hand, the rotary shaft 32 is set at the uppermost position (closest to the rotary shaft of the spool 4) at the middle portion of the guide slot 11g so as to set the clutch gear 31 to the uppermost position (closest to the rotary shaft of the spool 4). At the uppermost position, the clutch gear 31 meshes with the external teeth 17b of the carrier gear 17. Accordingly, the high-speed and low-torque transmission path between the clutch gear 31 and the carrier gear 17 is connected. That is, the motor 6 is connected to the spool 4 through the motor gear 13, the connecting gear 23, the idle gear 29, the upper-side connecting gear 27, the lower-side connecting gear 26, the clutch gear 31, the carrier gear 17, and the connector 14. Therefore, the low reduction ratio power transmission path is set. The rotary shaft 32 at the uppermost position is inserted into the supporting grooves 33c of the clutch arm 33 so as to come in contact with the clutch arm 33.

As described above, the low reduction ratio power transmission mode is a power transmission mode for power transmission with a low reduction ratio and in which the high-speed and low-torque transmission path is set. In the low reduction ratio power transmission mode, it is possible to quickly retract the seat belt by the motor 6. The low reduction ratio power transmission mode and the high reduction ratio power transmission mode as will be described later are defined as a state that the spool 4 and the power transmission mechanism 8 are mechanically connected so as to allow the transmission of the power of the motor 6 to the spool 4 via the power transmission mechanism 8.

When the motor 6 is driven and the power transmission mechanism 8 is set in the low reduction ratio power transmission mode or the high reduction ratio power transmission mode as will be described later, the power of the motor 6 is transmitted to the spool 4 via the power transmission mechanism 8. This state corresponds to the power transmission operation mode. When the motor 6 is not driven and the power transmission mechanism 8 is set in the low reduction ratio power transmission mode or the high reduction ratio power transmission mode as will be described later, large resistance in the unwinding direction is applied to the spool 4 by the power transmission mechanism 8 which is mechanically connected to the spool 4 so that the seat belt 3 is hardly unwound (withdrawn) from the spool 4 or the seat belt 3 is not allowed to be unwound (withdrawn) from the spool 4. This state corresponds to the power transmission allowing mode.

(3) High Reduction Ratio Power Transmission Mode

As shown in FIG. 8, in the high reduction ratio power transmission mode, the engaging portion 33e of the clutch arm 33 disengages from the recess 35b of the resistance spring 35 and is set at the curve portion of the resistance spring 35 on the upper side of the recess 35b. In the state that the engaging portion 33e disengages from the recess 35b, the engaging pawl 34b of the clutch pawl 34 engages one of the ratchet teeth 19b of the ring member 19 so as to stop the ring member 19 from rotation in the clockwise direction. Accordingly, the low speed and high torque transmission path between the sun gear member 20 and the carrier gear 17 is connected. That is, the motor 6 is connected to the spool 4 through the motor gear 13, the connecting gear 23, the idle gear 29, the external teeth 20b of the sun gear member 20, the sun gear 20a, the planetary gears 18, the carrier gear 17, and the connector 14. As a result, the high reduction ratio power transmission path by the planetary gear mechanism is set.

On the other had, the rotary shaft 32 is in contact with the left end of the guide slot 11g so as to set the clutch gear 31 to the leftmost position. At the leftmost position, the clutch gear 31 disengages from the external teeth 17b of the carrier gear 17. Accordingly, the high speed and low torque transmission path between the clutch gear 31 and the carrier gear 17 is disconnected.

The high reduction ratio power transmission mode is a power transmission mode for the power transmission with a high reduction ratio and in which the low speed and high torque transmission path is set. In the high reduction ratio power transmission mode, the seat belt is retracted with high tension by the motor 6.

The power transmission mode switching mechanism 9 conducts the power transmission mode switching among the power transmission disconnection mode, the low reduction ratio power transmission mode, and the high reduction ratio power transmission mode. The mode switching is conducted according to, for example, the following three styles of behavior.

(1) Switching from the Power Transmission Disconnection Mode to the Low Reduction Ratio Power Transmission Mode As the motor 6 rotates in the normal direction (the motor rotary shaft 6a rotates in the clockwise direction in FIG. 6: corresponding to rotation of the spool 4 in the belt winding direction (the direction β in FIG. 3)) in the power transmission disconnection mode shown in FIG. 6, the lower-side connecting gear 26 and the pulleys 25 are rotated in the respective directions corresponding to the belt winding direction P of the spool 4 via the motor gear 13, the connecting gear 23, the idle gear 29, and the upper-side connecting gear 27. Then, the clutch gear 31 rotates freely because the clutch gear 31 does not mesh with the external teeth 17b of the carrier gear 17. In this state, the rotary shaft 32 is free from any resistance so that the clutch spring 24 rotates in the same direction as the pulleys 25. Accordingly, the clutch gear 31 and the rotary shaft 32 move to the left along the guide slot 11g so that the rotary shaft 32 comes in contact with the clutch arm 33 as shown in FIG. 7.

In the state that the rotary shaft 32 is in contact with the clutch arm 33, the clutch gear 31 and the rotary shaft 32 are set to the uppermost positions as shown in FIG. 7 and the clutch gear 31 meshes with the external teeth 17b of the carrier gear 17. Accordingly, rotation of the clutch gear 31 is transmitted to the carrier gear 17, whereby the carrier gear 17 is rotated. If the seat belt 3 has slack in this sate, the seat belt 3 is wound onto the spool 4 by the rotation of the carrier gear 17. As the slack is removed, the spool 4 no longer rotates so that the carrier gear 17 no longer rotates. Therefore, the clutch gear 31 receives resistance from the carrier gear 17 so that the clutch gear 31 also no longer rotates.

On the other hand, the lower-side connecting gear 26 is forced to rotate due to rotational torque of the motor 6. Because of the rotational torque of the lower-side connecting gear 26, force is applied to the rotary shaft 32 in a direction toward the leftmost position. Since the rotary shaft 32 is in contact with the clutch arm 33, the clutch arm 33 is pressed by the rotary shaft 32. Since, however, the seat belt 3 is tightened with tension less than a predetermined value, the moment for rotating the clutch arm 33 in the clockwise direction due to pressing force applied by the rotary shaft 32 is smaller than the moment for preventing rotation of the clutch arm 33 in the clockwise direction due to the engagement between the engaging portion 33e and the recess 35b. Accordingly, the engaging portion 33e does not disengage from the recess 35b, the clutch arm 33 does not rotate, and the rotary shaft 32 is stopped at the position where the rotary shaft 32 is in contact with the clutch arm 33.

Since the rotary shaft 32 is stopped, the clutch gear 31 and the rotary shaft 32 are held at the aforementioned uppermost position as shown in FIG. 7. Since the clutch gear 31 is held at the uppermost position, the mesh between the clutch gear 31 and the external teeth 17b of the carrier gear 17 is maintained and connection of the high speed and low torque transmission path between the clutch gear 31 and the carrier gear 17 is maintained. Since the clutch arm 33 does not rotate, the clutch pawl 34 does not pivot, thereby holding the engaging pawl 34b at a position where the engaging pawl 34b does not engage the ratchet teeth 19b. As a result, the ring member 19 rotates freely, thereby maintaining the disconnection of the low speed and high torque transmission path between the sun gear member 20 and the carrier gear 17.

In this manner, the mode of the power transmission mechanism 8 is switched from the power transmission disconnection mode to the low reduction ratio power transmission mode, whereby the power transmission mechanism 8 is set to the low reduction ratio power transmission mode.

(2) Switching from the Low Reduction Ratio Power Transmission Mode to the High Reduction Ratio Power Transmission Mode The high reduction ratio power transmission mode is set by relatively high rotational torque of the motor 6. In this case, the power transmission mode is switched from the power transmission disconnection mode to the high reduction ratio power transmission mode through the low reduction ratio power transmission mode.

Switching from the power transmission disconnection mode to the low reduction ratio power transmission mode is performed in the same way as described above. However, when the mode is set to the high reduction ratio power transmission mode, the tension of the seat belt 3 is greater than the predetermined value. Accordingly, the moment applied to the clutch arm 33 due to the pressing force from the rotary shaft 32 in the low reduction ratio power transmission mode shown in FIG. 7 is greater than the moment for preventing rotation of the clutch arm 33 in the clockwise direction due to engagement between the engaging portion 33*e* and the recess 35*b*. As a result, the engaging portion 33*e* can disengage from the recess 35*b*.

When the clutch springs 24 further rotate in the counter-clockwise direction, the rotary shaft 32 moves toward the left along the guide slot 11*g* while rotating the clutch arm 33 in the clockwise direction about the supporting shaft 11*h*. Accordingly, the clutch gear 31 also further moves toward the left. As the rotary shaft 32 comes in contact with the left end of the guide slot 11*g*, further movement of the rotary shaft 32 is prevented so that the clutch gear 31, the rotary shaft 32, and the clutch springs 24 are stopped. Accordingly, as shown in FIG. 8, the clutch gear 31 and the rotary shaft 32 are set to the leftmost positions. At the leftmost positions, the clutch gear 31 comes off the external teeth 17*b* of the carrier gear 17 and the high speed and low torque transmission path between the clutch gear 31 and the carrier gear 17 is thus disconnected.

On the other hand, the clutch pawl 34 pivots about the clutch pawl pin 38 in the counter-clockwise direction along with the rotation of the clutch arm 33, and the engaging pawl 34*b* is set to a position capable of engaging the ratchet teeth 19*b* as shown in FIG. 8. Since the sun gear member 20 rotates by rotational torque of the motor 6 and the ring member 19 rotates in the clockwise direction, one of the ratchet teeth 19*b* engages the engaging pawl 34*b*. Accordingly, the rotation of the ring member 19 is stopped, whereby the low speed and high torque transmission path between the sun gear member 20 and the carrier gear 17 is connected.

In this manner, the mode of the power transmission mechanism 8 is switched from the low reduction ratio power transmission mode to the high reduction ratio power transmission mode, whereby the power transmission mechanism 8 is set to the high reduction ratio power transmission mode.

(3) Switching from the High Reduction Ratio Power Transmission Mode to the Power Transmission Disconnection Mode (Through the Low Reduction Ratio Power Transmission Mode)

As the motor 6 rotates in the reverse direction (the motor rotary shaft 6*a* rotates in the counterclockwise direction in FIG. 6: corresponding to rotation of the spool 4 in the belt-withdrawing direction (the direction α in FIG. 3)) in the high reduction ratio power transmission mode shown in FIG. 8, the lower-side connecting gear 26 and the pulleys 25 rotate in the direction opposite to the aforementioned direction. Then, the clutch springs 24 also rotate in the direction opposite to the aforementioned direction so that the clutch gear 31 and the rotary shaft 32 move to the right along the guide slot 11*g* while rotating the clutch arm 33 in the counterclockwise direction.

Since the clutch pawl 34 pivots in the clockwise direction along with the counter-clockwise rotation of the clutch arm 33, the clutch pawl 34 is positioned at the disengaging position not allowing the engagement of the clutch pawl 34 with the ratchet teeth 19*b*. Accordingly, the ring member 19 rotates freely, thereby disconnecting the low speed and high torque transmission path.

When the clutch gear 31 and the rotary shaft 32 reach the aforementioned uppermost position, the clutch gear 31 meshes with the external teeth 17*b* of the carrier gear 17 so that the power transmission mechanism 8 temporarily moves to the low reduction ratio power transmission mode shown in FIG. 7. Since the rightward movement of the clutch gear 31 and the rotary shaft 32 continues, however, the clutch gear 31 immediately comes off the external teeth 17*b* so that the clutch gear 31 idles away. Accordingly the high speed and low torque transmission path is temporarily connected and then immediately disconnected. When the high speed and low torque transmission path is connected temporarily, the motor 6 rotates in the reverse direction, and the spool 4 temporarily rotates in the belt-withdrawing direction α and stops soon.

As the rotary shaft 32 comes in contact with the right end of the guide slot 11*g*, further movement of the rotary shaft 32 is prevented so that the clutch gear 31, the rotary shaft 32, and the clutch springs 24 are stopped. The clutch gear 31 and the rotary shaft 32 are set to the rightmost positions shown in FIG. 6 as described in the above.

In this manner, the mode of the power transmission mechanism 8 is switched from the high reduction ratio power transmission mode to the power transmission disconnection mode, whereby the power transmission mechanism 8 is set to the power transmission disconnection mode.

In this embodiment, the mode of the power transmission mechanism 8 is switched by the control of the rotation of the motor 6.

Specifically with regard to the low reduction ratio power transmission mode, the mode is switched from the power transmission disconnection mode to the low reduction ratio power transmission mode and the low reduction ratio power transmission mode is continued when the motor 6 is controlled to rotate in the normal direction, while the mode is switched from the low reduction ratio power transmission mode to the power transmission disconnection mode so as to cancel the low reduction ratio power transmission mode when the motor 6 is controlled to rotate in the reverse direction.

With regard to the high reduction ratio power transmission mode, the mode is switched from the low reduction ratio power transmission mode to the high reduction ratio power transmission mode and the high reduction ratio power transmission mode is continued when the motor 6 is controlled to rotate in the reverse direction, while the mode is switched from the high reduction ratio power transmission mode to the low reduction ratio power transmission mode so as to cancel the high reduction ratio power transmission mode when the motor 6 is controlled to rotate in the normal direction.

Moreover, the seat belt retractor 1 of this embodiment has the following seven belt modes of the seat belt 3.

(1) Belt Storage Mode

Belt storage mode is a belt mode in which the seat belt 3 is not used and fully wound onto the spool 4. In the seat belt retractor 1 in the belt storage mode, the motor 6 is not driven and the power transmission mechanism 8 is set to the power transmission disconnection mode. Therefore, only very weak belt tension is applied to the seat belt 3 (the reason why very weak belt tension is applied will be described later with regard to a belt winding and storing mode) and the power consumption is zero.

(2) Belt Withdrawing Mode

Belt withdrawing mode is a belt mode in which the seat belt 3 is withdrawn from the spool 4 so as to be worn by the occupant. The seat belt retractor 1 in the belt withdrawing mode is also set in the power transmission disconnection mode. Therefore, the seat belt 3 can be withdrawn with small force. Also in this case, the motor 6 is not driven so that the power consumption is zero.

(3) Belt Winding and Fitting Mode

Belt winding and fitting mode is a belt mode in which after the seat belt 3 is withdrawn and the tongue (the tongue 62 in FIG. 1) is inserted into and latched with the buckle to turn ON the buckle switch (the buckle switch 66a in FIG. 1), excessively withdrawn part of the seat belt 3 is wound in order to fit the seat belt 3 to the occupant and a belt mode in which when the occupant moves so as to withdraw a predetermined amount of the seat belt 3 from the normally used state of the seat belt 3 (at this point, the buckle switch is in the ON state) and then the occupant returns to the original position, the withdrawn part of the seat belt is wound. In the seat belt retractor 1 in the belt winding and fitting mode, the motor 6 is driven to rotate in the belt winding direction and the power transmission mechanism 8 is set to the low reduction ratio power transmission mode. Therefore, the motor 6 is stopped when very small predetermined belt tension is generated after the seat belt 3 is rapidly wound with low torque, whereby the seat belt 3 is worn by and fitted to the occupant.

(4) Normal Wearing Mode (Comfortable Mode)

Normal wearing mode (comfortable mode) is a belt mode in which the occupant wears the seat belt 3 in the normal state after the belt winding and fitting mode is terminated. In the seat belt retractor 1 in the normal wearing mode, the motor 6 is not driven and the power transmission mechanism 8 is set in the power transmission disconnection mode. Therefore, only very weak belt tension is applied to the seat belt 3 so that the occupant can wear the seat belt 3 without any stress. In addition, the power consumption is zero.

(5) Warning Mode

Warning mode is a belt mode in which when the system detects dozing of the driver or detects an obstacle in front of the vehicle in the driving direction, the seat belt 3 is wound repeatedly predetermined times so as to warn the driver. In the seat belt retractor 1 in the warning mode, the motor 6 is controlled to be driven repeatedly.

Therefore, the operation of applying relatively strong belt tension (which is weaker than that of the belt tension during the emergency mode) and very weak belt tension onto the seat belt 3 is repeated, thereby alerting the driver to dozing or the obstacle in front of the vehicle in the driving direction.

(6) Emergency Mode

Emergency mode is a belt mode which is set when the vehicle extremely likely have a collision with an obstacle or the like while driving the vehicle with wearing the seat belt in the normal wearing mode and comprises the following two stages.

(i) Initial Stage

In the seat belt retractor 1 in the initial stage of the emergency mode, the motor 6 is rotated with relatively high rotational torque in the normal direction. Then, from the power transmission disconnection mode, the clutch springs 24 rotate so as to move the clutch gear 31 and the rotary shaft 32 to the uppermost positions so that the clutch gear 31 meshes the external teeth 17b of the carrier gear 17. Since the slack of the seat belt 3 is removed and the tension on the seat belt 3 is not higher than the predetermined value at this point, the resistance from the carrier gear 17 to the clutch gear 31 is relatively small. Accordingly, even with relatively high rotational torque of the motor 6, the rotary shaft 32 does not rotate the clutch arm 33 so that the power transmission mechanism 8 is set to the low reduction ratio power transmission mode. Therefore, the rotation of the clutch gear 31 is transmitted to the carrier gear 17 so as to rotate the carrier gear 17, whereby the seat belt 3 is rapidly wound with low torque to promptly remove the slack of the seat belt 3.

(ii) Late Stage

As the slack of the seat belt 3 is removed in the aforementioned initial stage, the initial stage is followed by the late stage of the emergency mode. In the late stage, the tension on the seat belt 3 becomes larger than the predetermined value. Accordingly, the resistance from the carrier gear 17 to the clutch gear 31 becomes relatively large so as to stop the rotation of the carrier gear 17 and the clutch gear 31. However, the lower-side connecting gear 26 is forced to rotate by the rotational torque of the motor 6. By the rotational torque of the lower-side connecting gear 26, force is applied to the rotary shaft 32 in a direction toward the aforementioned leftmost position. At this time, since the rotational torque of the motor 6 is relatively high, the moment for rotating the clutch arm 33 in the clockwise direction by the pushing force of the rotary shaft 32 is larger than the moment against this moment in the clockwise direction by the engaging force between the engaging portion 33e and the recess 35b. Accordingly, the engagement between the engaging portion 33e of the clutch arm 33 and the recess 35b of the resistance spring 35 is cancelled so that the rotary shaft 32 moves toward the aforementioned leftmost position with rotating the clutch arm 33. Since the clutch pawl 34 pivots along with the rotation of the clutch arm 33, the engaging pawl 34b of the clutch pawl 34 engages one of the ratchet teeth 19b, thereby preventing the rotation of the ring member 19. As a result, the power transmission mechanism 8 is set to the high reduction ratio power transmission mode. Therefore, the seat belt 3 is wound with high torque so that the occupant is restrained with very strong belt tension.

(7) Belt Winding and Storing Mode

Belt winding and storing mode is a belt mode in which the seat belt 3 is fully wound to be in the storage state when the tongue (the tongue 62 in FIG. 1) is disengaged from the buckle for releasing the wearing of the seat belt 3 so that the buckle switch (the buckle switch 66a in FIG. 1) changes to an OFF state. In the seat belt retractor 1 in the belt winding and storing mode, the motor 6 is driven with relatively weak rotational torque in the belt winding direction and the power transmission mechanism 8 is set to the low reduction ratio power transmission mode. Accordingly, the withdrawn seat belt 3 is promptly wound with low torque.

Thus, the seat belt 3 is fully wound and the motor 6 is stopped when a predetermined belt tension which is very weak is developed, whereby the seat belt 3 moves to the belt storage mode in which the aforementioned very weak belt tension is applied to the seat belt 3.

Figure 9:
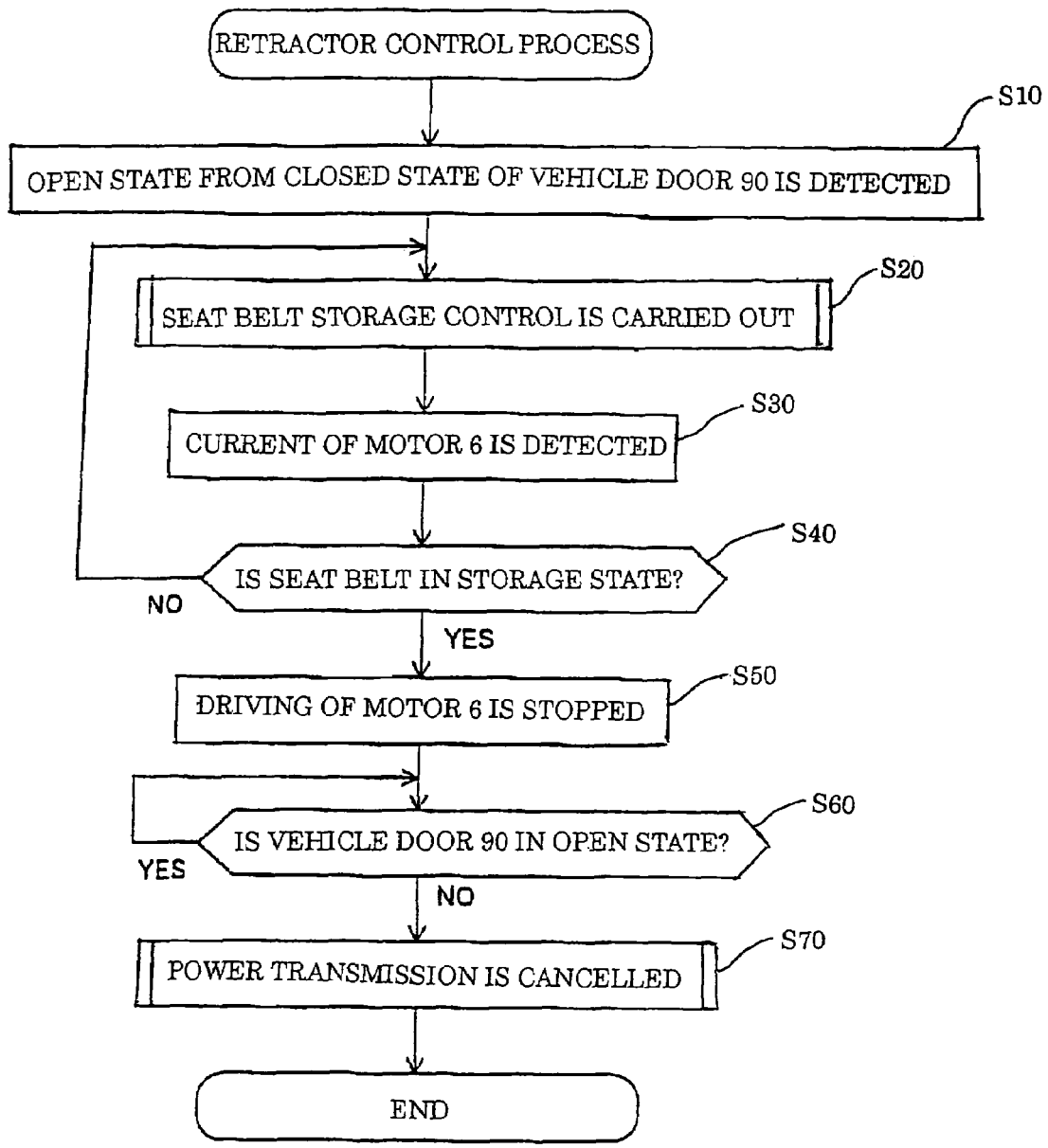
FIG. 9 is a flow chart showing the retractor control process in the seat belt retractor of an embodiment.

In reference to the belt winding and storing mode, the seat belt retractor of this embodiment is adapted to perform a control for changing the mode in the power transmission mechanism 8 according to the condition whether the door is opened or closed, thereby preventing occurrence of a trouble in which the seat belt 3 is not stored and kept unwound even when the seat belt 3 is needed to be stored, for the purpose of conducting the storing action for the seat belt 3 by using the electric motor. This control is achieved by that the control mechanism (the ECU 68 as shown in FIG. 1 and FIG. 2) performs, for example, "retractor control process" shown in FIG. 9. FIG. 9 is a flow chart of the retractor control process according to this embodiment.

In the retractor control process shown in FIG. 9, in step S10, it is detected that a vehicle door (for example, the door 90 shown in FIG. 1) moves from a closed state to an open state.

This detection is conducted by the ECU 68 which detects information from the vehicle door sensor 91.

In step S20, seat belt storing control is conducted. In the seat belt storing control, the driving of the motor 6 is controlled so as to set the power transmission mechanism 8 to the low reduction ratio power transmission mode so that the withdrawn seat belt 3 is promptly wound (or stored) onto the spool 4 with low torque. This action is conducted not only when the seat belt 3 is in the withdrawn state but also when the seat belt 3 is already in the stored state.

In step S30, the motor current value of the motor 6 is detected (measured) in order to detect the stored state of the seat belt after the seat belt storing control is conducted in step S20. The motor current value is detected by a motor current detector 69 shown in FIG. 2. When the motor current value detected by step S30 exceeds a reference value, the motor load is relatively high and, in step S40, it is detected that the seat belt is in the stored state.

When it is determined that the seat belt 3 is in the stored state in step S40 (Yes in step S40), the process proceeds to step S50 where the driving of the motor 6 is stopped (rotation stoppage control is conducted). When the rotation of the motor 6 is stopped by the rotation stoppage control, the power transmission mechanism 8 is still set in the low reduction ratio power transmission mode so as to continue the connected state between the motor 6 and the spool 4. Accordingly, high resistance against unwinding is applied to the spool 4 by the power transmission mechanism 8, thereby keeping the state that the unwinding (withdrawal) of the seat belt 3 from the spool 4 is restricted. Specifically, the state that the seat belt 3 is hardly unwound (withdrawn) from the spool 4 or the state that it is impossible to unwind (withdraw) the seat belt 3 is kept. On the other hand, when the motor current value detected in step S30 is lower than the reference value and it is determined in step S40 that the seat belt 3 is still not in the stored state (No in step S40), the process returns to step S20.

In step 60 following step S50, it is determined whether or not the vehicle door 90 is in the open state. Only when it is determined in step S60 that the vehicle door 90 is not in the open state, i.e. the vehicle door 90 moves to the closed state from the open state (NO in step S60), the process proceeds to step S70. In short, in the embodiment shown in FIG. 9, the power transmission cancellation is conducted in step S70 on the condition that the vehicle door 90 moves to the closed state from the open state.

In the power transmission cancellation in step S70, the driving of the motor 6 is controlled to switch the power transmission mechanism 8 from the low reduction ratio power transmission mode to the power transmission disconnection mode and, after the switching, the driving of the motor 6 is stopped (rotation stoppage control is conducted). When the rotation of the motor 6 is stopped by the rotation stoppage control, the disconnected state is accomplished where the connection between the motor 6 and the spool 4 is canceled according to the setting of the power transmission mechanism 8. Since the spool 4 is completely separated from the power transmission mechanism 8 side (the motor 6 side), the resistance against the unwinding applied to the spool 4 by the power transmission mechanism 8 is reduced so that the rotation of the spool 4 is easily allowed, thereby facilitating the withdrawal (unwinding) of the seat belt 3 wound around the spool 4.

In the conventional structure where only the opening/closing of the vehicle door and the operation of a seat belt buckle are used as triggers for the seat belt storing operation, for example, when a vehicle occupant starts to withdraw the seat belt for the purpose of wearing the seat belt with the vehicle door being in the open state, but stops the action of withdrawing the seat belt without buckling the seat belt because the occupant remembers that he/she has an errand to do and is about to exit the vehicle, it is assumed that the withdrawn state of the seat belt is continued and the seat belt is clamped by the vehicle door.

In order to avoid such a problem, the seat belt retractor 1 of this embodiment is structured to promptly conduct the action of winding (storing) the seat belt when the vehicle door 90 moves to the open state from the closed state and keep the power transmission mechanism 8 being set in the low reduction ratio power transmission mode. In this manner, the unwinding (withdrawal) of the seat belt 3 from the spool 4 is restricted (step S10 to step S50 shown in FIG. 9). Accordingly, emergence of the aforementioned assumption that the motor is not triggered to operate when the seat belt is in the withdrawn state can be fundamentally prevented, thereby ensuring the operation of storing the seat belt 3 by using the motor 6.

In this embodiment, the seat belt 3 is restricted from being withdrawn when the vehicle door 90 is in the open state, thereby preventing the seat belt 3 from being kept in the withdrawn state. On the other hand, when the vehicle door 90 moves to the closed state and the vehicle occupant C starts to wear the seat belt 3, the seat belt 3 is allowed to be withdrawn, thereby allowing smooth wearing of the seat belt by the vehicle occupant C. Therefore, this control is especially effective for a situation, for example, that the vehicle occupant C stops the withdrawing action of the seat belt with the vehicle door 90 being in the open state and exits the vehicle and, after that, the vehicle occupant C enters the vehicle again, closes the vehicle door 90, and wears the seat belt 3. This control must be rational control taking the pattern of vehicle occupant's behavior into consideration.

Figure 10:
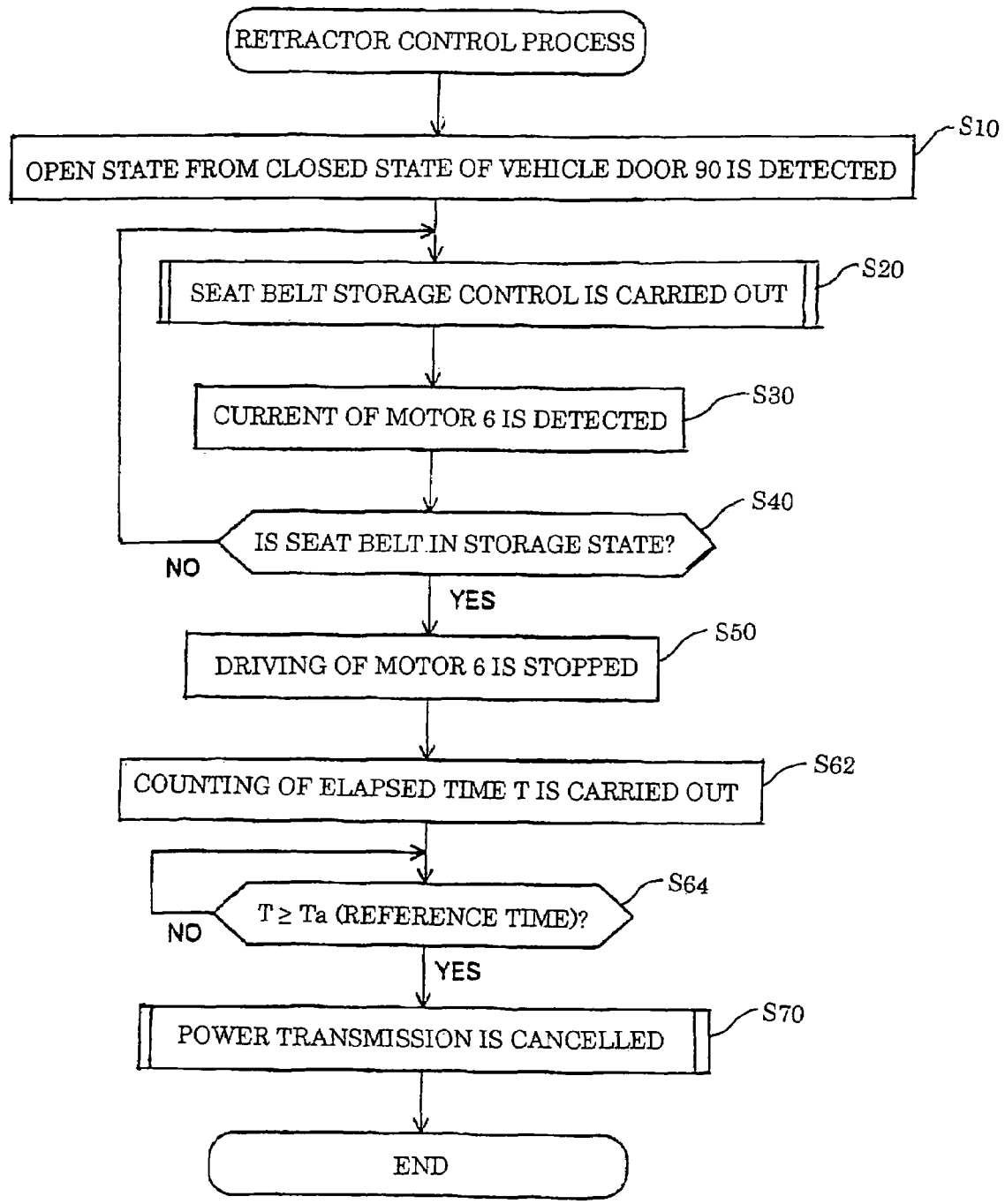
FIG. 10 is a flow chart showing the retractor control process according to another embodiment.

Instead of the retractor control process shown in FIG. 9, "retractor control process" shown in FIG. 10 may be employed. FIG. 10 is a flow chart for the retractor control process according to another embodiment.

In the retractor control process shown in FIG. 10, step S62 and step S64 are conducted instead of step S60 of the retractor control process shown in FIG. 9. The other steps are the same as those of the retractor control process shown in FIG. 9, so the following description will be made as regard to step S62 and step S64.

In step S62 shown in FIG. 10, the counting of elapsed time T by, for example, a timer (not shown) is started after step S50. In step S62, the elapsed time T from the seat belt winding-up action (the seat belt storing action) is detected. In step S64 shown in FIG. 10, it is determined whether or not the elapsed time T reaches a predetermined reference time Ta. The reference time Ta in step S64 is preferably set on the assumption of time from when the vehicle occupant temporarily exits the vehicle to when the vehicle occupant enters the vehicle again. For example, the reference time Ta is set to be several minutes. Only when it is determined that the elapsed time T reaches the reference time Ta in step S64 (YES in step S64), the power transmission cancellation in step S70 is conducted. In short, in the embodiment shown in FIG. 10, the power transmission cancellation is conducted in step S70 on the condition that the predetermined reference time Ta is elapsed. As the reference time Ta elapsed after the seat belt winding-up action (the seat belt storing action), the power transmission mechanism 8 is switched from the low reduction ratio power transmission mode to the power transmission disconnection mode, thereby allowing the easy withdrawal (unwinding) of the seat belt 3 from the spool 4.

According to this control, the seat belt 3 is restricted from being withdrawn when the vehicle door 90 is in the open state, thereby preventing the seat belt 3 from being kept in the withdrawn state. On the other hand, when the vehicle occupant C enters the vehicle and starts to wear the seat belt 3, the seat belt 3 is allowed to be withdrawn after a lapse of the reference time Ta regardless of the state of the vehicle door 90, thereby allowing smooth wearing of the seat belt by the vehicle occupant C. Therefore, this control is especially effective for a situation, for example, that the vehicle occupant C stops the withdrawing action of the seat belt with the vehicle door 90 being in the open state and exits the vehicle and, after that without closing the vehicle door, the vehicle occupant C enters the vehicle a relatively short time later and wears the seat belt 3. This control must be rational control taking the pattern of vehicle occupant's behavior into consideration.

In the embodiment shown in FIG. 10, the start of the counting of the elapsed time which is used as the base for determining the timing for switching the power transmission mechanism 8 from the low reduction ratio power transmission mode to the power transmission disconnection mode (in step S62 shown in FIG. 10) is set to timing when the seat belt winding-up action is finished. However, the start of the counting may be set to any timing after the vehicle door 90 moves to the open state (any timing from step S10 to step S64 shown in FIG. 10). Specifically, the start of the counting may be first timing when the seat belt winding-up action is started (timing corresponding to step S20) or second timing when the vehicle door moves to the open state before the vehicle occupant exits the vehicle (timing corresponding to step S10). When the start of the counting is set to the first timing, time period as a sum of "time period from the start of the seat belt winding-up action to the finish of the seat belt winding-up action" and "time period from alighting of vehicle occupant from the vehicle to boarding of the vehicle occupant on the vehicle" is previously estimated and the reference time Ta is set based on the estimated time period.

Furthermore, since the power transmission mechanism 8 of the seat belt retractor 1 of this embodiment has two power transmission paths, i.e. the high speed and low torque power transmission path serving as the low reduction ratio power transmission mode and the low speed and high torque power transmission path serving as the high reduction ratio power transmission mode, the seat belt retractor 1 achieves two winding functions, i.e. rapid belt winding for removing slack on the seat belt 3 in the low reduction ratio power transmission mode, and high-torque belt winding for restraining the occupant in the high reduction ratio power transmission mode.

Because the transmission path can be selected from the two power transmission paths, the rotational torque of the motor 6 is efficiently transmitted to the spool 4, thereby performing the two winding-up functions in a sure manner with small power consumption. In particular, high-torque seat belt winding for restraining the passenger is carried out through the low speed and high torque power transmission path so that the motor 6 is driven with small rotational torque as compared with the conventional one. Thus, a small-sized motor can be employed as the motor 6, as well as driving the motor with reduced power consumption, thereby reducing the size of the seat belt retractor 1.

Because the aforementioned two winding functions are realized, the seat belt retractor 1 is provided with a pretensioning function by rotational torque of the motor 6. Therefore, this can eliminate the necessity of a pretensioner using reaction gas in the conventional seat belt retractor, thereby reducing the cost.

Furthermore, the mode of the power transmission mechanism 8 is set to the low reduction ratio power transmission mode or the high reduction ratio power transmission mode according to the tension of the seat belt 3, thereby easily performing mode switching without controlling rotational torque of the motor 6.

The power transmission mechanism 8 has the power transmission disconnection mode in which the rotational torque of the motor 6 is not transmitted to the spool, thereby allowing withdrawal of the seat belt 3, normal wearing of the seat belt 3 without applying stress to the occupant, and storage of the seat belt 3 when it is not used by the occupant without influence of the motor 6.

Since the winding and storing operation for the seat belt 3 is conducted only by the rotational torque of the motor 6, the biasing force of a winding elements such as a spiral spring in the belt winding direction which always acts on the seat belt 3 can be eliminated or can be set to very small without an additional module such as a tension reducer.

In cases where the biasing force by the winding elements is set to be in a minimal range required for the fitting operation when the occupant wears the seat belt 3, the rotation of the motor 6 is transmitted to the spool 4 in the low reduction ratio transmission mode so as to assist the winding of the seat belt 3, thereby securing the winding and storing operation for the seat belt 3.

Further, the high-ratio speed reduction mechanism 7a is formed of a planetary gear mechanism, thereby reducing the size of the low speed and high torque transmission path. Increase in size of the seat belt retractor 1 is inhibited even though the power transmission mechanism 8 has the low reduction ratio power transmission mode and the high reduction ratio power transmission mode.

Furthermore, the carrier of the high-ratio speed reduction mechanism 7a and the external teeth 17b of the low-ratio speed reduction mechanism 7b are both composed of a single carrier gear 17, thereby reducing the number of the components of the seat belt retractor 1 and thus reducing the size of the seat belt retractor 1.

According to the tension on the seat belt 3, the power transmission mode switching mechanism 9 controls the rotation of the internal gear 19a of the planetary gear mechanism and controls the mesh between the small-diameter clutch gear 31 and the external teeth 17b of the large-diameter carrier gear 17, thereby easily switching the power transmission mode.

The present invention is not limited to the aforementioned embodiment, so various variations and modifications may be made. For example, the following embodiments as variations of the aforementioned embodiment may be carried out.

The above embodiment has been described with regard to the seat belt retractor 1 having a structure capable of switching its mode between the power transmission operation mode and the power transmission disconnection mode according to the rotational behavior of the motor 6. Instead of the structure capable of switching its mode between the power transmission operation mode and the power transmission disconnection mode according to the rotational behavior of the motor, the present invention may employ a structure capable of switching its mode between the power transmission operation mode and the power transmission disconnection mode by an electromagnetic switching mechanism.

The above embodiment has been described with regard to the seat belt retractor 1 to be installed in an automobile, the present invention can be adopted to seat belt apparatuses to be installed in a vehicle for transfer of occupant(s) such as automobile, aircraft, boat, and train and is suitably adopted to a seat belt retractor of a type that winds up the seat belt by a motor for restraining and protecting an occupant.

Japan Priority Application 2005-146334, filed May 19, 2005 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor comprising:
   a spool capable of winding and unwinding a seat belt;
   an electric motor;
   a power transmission mechanism disposed between the electric motor and the spool to achieve a connected state when the electric motor and the spool are connected and a disconnected state when the connected state is cancelled; and
   a control mechanism to control the electric motor and the power transmission mechanism to switch between a power transmission operation mode in which the electric motor is driven and the power transmission mechanism is in the connected state, a power transmission allowing mode in which the driving of the electric motor is stopped and the power transmission mechanism is in the connected state, and a power transmission disconnection mode in which the power transmission mechanism is in the disconnected state,
   wherein when a vehicle door corresponding to the seat belt moves from the closed state to an open state, the control mechanism switches to the power transmission operation mode to conduct the seat belt winding-up action by the spool and, after the seat belt winding-up action, the control mechanism switches to the power transmission allowing mode to maintain the power transmission mechanism in the connected state.

2. A seat belt retractor as claimed in claim 1, wherein when the control mechanism switches to the power transmission allowing mode after the seat belt winding-up action, the control mechanism controls the switching from the power transmission allowing mode to the power transmission disconnection mode on the condition that the vehicle door moves from the open state to the closed state.

3. A seat belt retractor as claimed in claim 1, wherein when the control mechanism switches to the power transmission allowing mode after the seat belt winding-up action, the control mechanism controls the switching from the power transmission allowing mode to the power transmission disconnection mode on the condition that a predetermined reference time is elapsed.

4. A seat belt apparatus comprising:
   a seat belt to be worn by a vehicle occupant;
   a spool capable of winding and unwinding the seat belt;
   an electric motor;
   a power transmission mechanism disposed between the electric motor and the spool to achieve a connected state when the electric motor and the spool are connected and a disconnected state when the connected state is cancelled; and
   a control mechanism to control the electric motor and the power transmission mechanism to switch between a power transmission operation mode in which the electric motor is driven and the power transmission mechanism is in the connected state, a power transmission allowing mode in which the driving of the electric motor is stopped and the power transmission mechanism is in the connected state, and a power transmission disconnection mode in which the power transmission mechanism is in the disconnected state,
   wherein when a vehicle door corresponding to the seat belt moves from a closed state to an open state, the control mechanism switches to the power transmission operation mode to conduct the seat belt winding-up action by the spool and, after the seat belt winding-up action, the control mechanism switches to the power transmission allowing mode to maintain the power transmission mechanism in the connected state.

5. A seat belt apparatus as claimed in claim 4, wherein when the control mechanism switches to the power transmission allowing mode after the seat belt winding-up action, the control mechanism controls the switching from the power transmission allowing mode to the power transmission disconnection mode on the condition that the vehicle door moves from the open state to the closed state.

6. A seat belt apparatus as claimed in claim 4, wherein when the control mechanism switches to the power transmission allowing mode after the seat belt winding-up action, the control mechanism controls the switching from the power transmission allowing mode to the power transmission disconnection mode on the condition that a predetermined reference time is elapsed.

7. A vehicle comprising:
   a vehicle door;
   a detection sensor to detect information about the opening and closing of the vehicle door; and
   a seat belt apparatus accommodated in an accommodating space in the vehicle, the seat belt apparatus including:
      a seat belt to be worn by a vehicle occupant and corresponding to the vehicle door;
      a spool capable of winding and unwinding the seat belt;
      an electric motor;
      a power transmission mechanism disposed between the electric motor and the spool to achieve a connected state when the electric motor and the spool are connected and a disconnected state when the connected state is cancelled; and
      a control mechanism to control the electric motor and the power transmission mechanism to switch between a power transmission operation mode in which the electric motor is driven and the power transmission mechanism is in the connected state, a power transmission allowing mode in which the driving of the electric motor is stopped and the power transmission mechanism is in the connected state, and a power transmission disconnection mode in which the power transmission mechanism is in the disconnected state,
      wherein when the vehicle door moves from a closed state to an open state, the control mechanism switches to the power transmission operation mode to conduct the seat belt winding-up action by the spool and, after the seat belt winding-up action, the control mechanism switches to the power transmission allowing mode to maintain the power transmission mechanism in the connected state.

8. A vehicle as claimed in claim 7, wherein when the control mechanism switches to the power transmission allowing mode after the seat belt winding-up action, the control mechanism controls the switching from the power transmission allowing mode to the power transmission disconnection mode on the condition that the vehicle door moves from the open state to the closed state.

9. A vehicle as claimed in claim 7, wherein when the control mechanism switches to the power transmission allowing mode after the seat belt winding-up action, the control mechanism controls the switching from the power transmission allowing mode to the power transmission disconnection mode on the condition that a predetermined reference time is elapsed.

* * * * *